United States Patent
Ko et al.

(10) Patent No.: US 11,443,151 B2
(45) Date of Patent: Sep. 13, 2022

(54) DRIVING ASSISTANT SYSTEM, ELECTRONIC DEVICE, AND OPERATION METHOD THEREOF

(71) Applicant: SAMSUNG ELECTRONICS CO., LTD., Suwon-si (KR)

(72) Inventors: Sangsoo Ko, Yongin-si (KR);
Byeoungsu Kim, Hwaseong-si (KR);
Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 16/874,994

(22) Filed: May 15, 2020

(65) Prior Publication Data
US 2021/0064913 A1 Mar. 4, 2021

(30) Foreign Application Priority Data
Sep. 3, 2019 (KR) .......................... 10-2019-0108932

(51) Int. Cl.
*G06K 9/62* (2022.01)
*H04N 13/128* (2018.01)
(Continued)

(52) U.S. Cl.
CPC ............. *G06K 9/629* (2013.01); *G06V 20/58* (2022.01); *G06V 20/647* (2022.01);
(Continued)

(58) Field of Classification Search
USPC ................................ 382/103, 104, 154, 195
See application file for complete search history.

(56) References Cited

U.S. PATENT DOCUMENTS 6,493,023 B1 12/2002 Watson
7,590,310 B2 9/2009 Retterath et al.
(Continued)

OTHER PUBLICATIONS

Howard, et al., "MobileNets: Efficient Convolutional Neural Networks for Mobile Vision Applications", arXiv:1704.04861v1 [cs. CV] 17, Apr. 2017, pp. 1-9.
(Continued)

*Primary Examiner* — Kathleen Y Dulaney
(74) *Attorney, Agent, or Firm* — F. Chau & Associates, LLC

(57) ABSTRACT

Systems and method for automated driving assistance are described. A driving assistant system may include a first sensor unit configured to provide an input image including another vehicle and a background; an image processor configured to generate a plurality of pyramid images by down-sampling the input image, acquire a depthmap including depth values from the first sensor unit to the other vehicle and the background, generate a plurality of pieces of mask data with different average depths of the depth values based on the depthmap, and output a plurality of masked images representing different average distances from the first sensor unit based on the plurality of pieces of mask data and the plurality of pyramid images; a feature extractor configured to output feature data of each of the plurality of masked images; and a detector configured to detect the other vehicle included in the input image based on the feature data.

11 Claims, 18 Drawing Sheets

(51) Int. Cl.
  *H04N 13/239* (2018.01)
  *G06V 20/58* (2022.01)
  *G06V 20/64* (2022.01)
  *H04N 13/00* (2018.01)

(52) U.S. Cl.
  CPC ......... *H04N 13/128* (2018.05); *H04N 13/239* (2018.05); *G06V 2201/08* (2022.01); *H04N 2013/0081* (2013.01)

(56) References Cited

U.S. PATENT DOCUMENTS

| | | | |
|---|---|---|---|
| 8,098,889 B2 | 1/2012 | Zhu et al. | |
| 8,411,938 B2* | 4/2013 | Zhang | G06T 5/007 382/302 |
| 8,861,842 B2* | 10/2014 | Jung | G06V 20/58 382/155 |
| 8,873,883 B2 | 10/2014 | Zhang et al. | |
| 8,881,842 B2 | 10/2014 | Jung et al. | |
| 9,275,308 B2 | 3/2016 | Szegedy et al. | |
| 9,443,316 B1* | 9/2016 | Takeda | G06T 7/11 |
| 9,542,748 B2 | 1/2017 | Mazurenko et al. | |
| 2016/0012567 A1* | 1/2016 | Siddiqui | H04N 13/271 382/154 |
| 2020/0074661 A1* | 3/2020 | Anisimovskiy | G06T 3/0006 |
| 2020/0160559 A1* | 5/2020 | Urtasun | G06K 9/629 |
| 2021/0019892 A1* | 1/2021 | Zhou | G06V 10/34 |

OTHER PUBLICATIONS

Author Unknown, "Tensorflow Detection Model Zoo", [located on the internet at: https://github.com/tensorflow/models/blob/master/research/object_detection/g3doc/detection_model_zoo.md], 5 pages.
Girschick, et al., "Rich Feature Hierarchies for Accurate Object Detection and Semantic Segmentation Tech Report", arXiv:1311.2524V5 [cs.CV] Oct. 22, 2014, 21 pages.
Ren, et al., "Faster R-CNN: Towards Real-Time Object Detection With Region Proposal Networks", arXiv:1506.01497v3 [cs.CV] Jan. 6, 2016, 14 pages.
Jung, et al., "Real-Time MDNET", arXiv:1808.08834v1 [cs.CV] Aug. 27, 2018, 16 pages.
Walther, et al., "Attentional Selection for Object Recognition—A Gentle Way", 2002, BMCV (International Workshop on Biologically Motivated Computer Vision), pp. 472-479.
Wang, et al., "Residual Attention Network for Image Classification", arXiv:1704.06904v1 [cs.CV] Apr. 23, 2017, 9 pages.
Poulos, et al., "Character-Based Handwritten Text Transcription With Attention Networks", arXiv:1712.04046v2 [cs.CV] Apr. 22, 2019, 18 pages.
Poulos, et al., "Attention Networks for Image-To-Text", arXiv:1712.04046va [cs.CV] Dec. 11, 2017, 12 pages.

* cited by examiner

DRIVING ASSISTANT SYSTEM, ELECTRONIC DEVICE, AND OPERATION METHOD THEREOF

CROSS-REFERENCE TO RELATED APPLICATION

This application claims the benefit of Korean Patent Application No. 10-2019-0108932, filed on Sep. 3, 2019, in the Korean Intellectual Property Office, the disclosure of which is incorporated by reference herein in its entirety.

BACKGROUND

The inventive concept relates to a driving assistant system, an electronic device for detecting an object included in an image, and an operation method thereof.

Modern vehicles include a large number of electronic components. For example, sensors and computers are often used to detect objects, calculate distances or speeds, and predict future events. Driver assist technologies may use these components to help a driver perform operations such as lane changes, adaptive cruise control, blind spot monitoring, and night-time object detection. In some cases, vehicles equipped with driver assist technology can automatically react to external objects and events, without driver input.

Vehicles that include driver assist technology may gather and process large quantities of data. This imposes significant computational demands on the on-board computers. In some cases, this results in slower computational speeds, which can degrade the performance of the driver assist technology and reduce the safety of the vehicle. Therefore, there is a need in the art for vehicle assist technology systems that require less data and computation without sacrificing performance.

SUMMARY

The present disclosure describes a driving assistant system and an electronic device for effectively detecting an object from a high-resolution image using an artificial neural network, and an operation method thereof.

According to an aspect of the inventive concept, a driving assistant system may include a first sensor unit configured to provide an input image including another vehicle and a background; an image processor configured to generate a plurality of pyramid images by down-sampling the input image, identify a depthmap including depth values to the other vehicle and the background, generate a plurality of pieces of mask data with different average depths of the depth values based on the depthmap, and output a plurality of masked images representing different average distances based on the plurality of pieces of mask data and the plurality of pyramid images; a feature extractor configured to output feature data of each of the plurality of masked images; and a detector configured to detect the other vehicle included in the input image, based on the feature data.

According to another aspect of the inventive concept, an electronic device for detecting an object from an input image may include an image processor configured to generate a first pyramid image by down-sampling the input image, generate a second pyramid image by down-sampling the first pyramid image, identify, as a first region, a partial region of which an average distance indicates a first value from the first pyramid image, identify, as a second region, a partial region of which an average distance indicates a second value from the second pyramid image, the second value being greater than the first value, and output images of the first region and the second region; a first core configured to generate first feature data including feature values of the first region and detect an object in the first region based on the first feature data; and a second core configured to generate second feature data including feature values of the second region and detect an object in the second region based on the second feature data.

According to another aspect of the inventive concept, an operation method of an electronic device may include generating a first pyramid image by down-sampling an input image including an object and a background; generating a second pyramid image by down-sampling the first pyramid image; masking a region remaining by excluding, from the first pyramid image, a first region with an average distance of a first value; masking a region remaining by excluding, from the second pyramid image, a second region with an average distance of a second value that is less than the first value; acquiring a plurality of pieces of feature data from a plurality of masked images generated based on the masking operations; and detecting the object based on the plurality of pieces of feature data.

According to another embodiment of the inventive concept, a method of image processing may comprise receiving input data including image data and distance data corresponding to the image data; generating a plurality of down-sampled images based on the image data, wherein each of the plurality of down-sampled images corresponds to a different image resolution; generating a plurality of image masks based on the distance data, wherein each of the plurality of image masks corresponds to a different average distance value; generating a plurality of masked images, wherein each of the plurality of masked images is based on one of the plurality of down-sampled images and one of the plurality of image masks; generating feature data based on the plurality of masked images; and detecting an object based on the feature data.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present disclosure describes systems and methods for object detection. For example, object detection systems may be used to provide driving stability and efficiency in a vehicle by identifying an object in view of a driving assistant system. As technology improves the amount of data collected by vehicle sensors tends to increase. High-resolution images are particularly useful in recognizing distant objects. Due to the use of these high resolution images, a vehicle object detection model may depend on an increased level of computation to process the image data in real-time.

In some cases, increasing computational requirements may exceed the capacity of on-board computer systems. When this happens, the real-time operation of a vehicle or system may be compromised. If this challenge is addressed by reducing the complexity of a feature extractor in the system backbone, computational needs may be reduced but object identification accuracy may also be reduced.

Driver assist systems may operate by identifying an image including a set of objects (both close objects and distant objects). Next, the size and distance of each object is determined (i.e., whether it is a large object, such as a vehicle or human, or a small object such as a bird or a ball). In some cases, the size of the object may be used to determine the distance between the object and the vehicle. After the distance of each object is determined, one or more region of interest (RoI) is determined based on the objects and the distances to each object.

According to embodiments of the present disclosure, a RoI may be divided into several sub-regions, which may be down-sampled to a lower resolution based on the distance information. A modified image including some down-sampled portions may be used as input for a feature extractor, a tracker, or the like. By using images in which certain portions are downsampled, the overall volume of data may be reduced. However, since a high resolution is used for critical parts of the image, the overall performance of the system may not be reduced.

Hereinafter, embodiments of the inventive concept will be described in detail with reference to the accompanying drawings.

Figure 1:
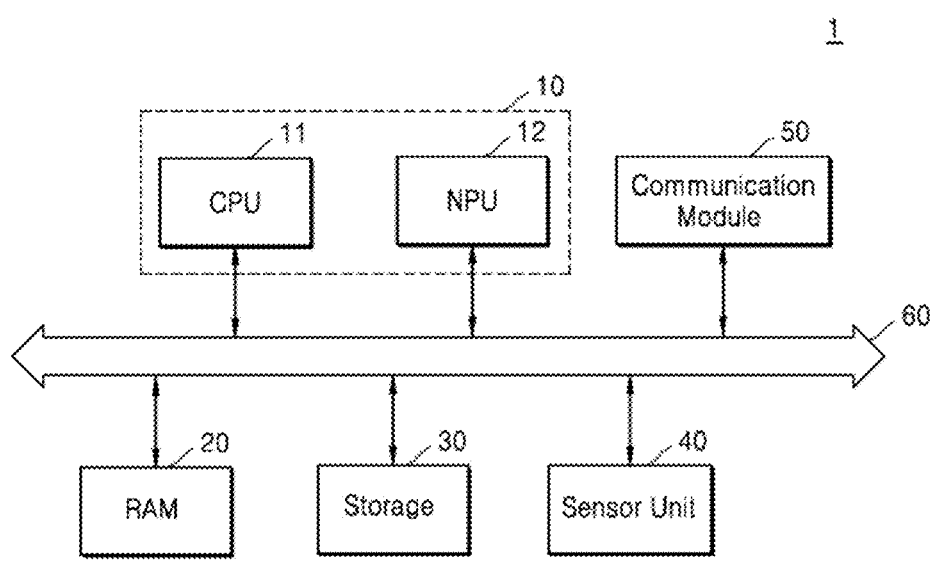
FIG. 1 is a block diagram of an electronic device according to an example embodiment of the inventive concept.

FIG. 1 is a block diagram of an electronic device 1 according to an example embodiment of the inventive concept.

The electronic device 1, according to an example embodiment of the inventive concept, may extract valid information by analyzing input data. Additionally, The electronic device 1 may generate output data based on the extracted information. For example, the input data may be an image obtained by photographing a front view ahead from the electronic device 1. The valid information may be an object (another vehicle, a pedestrian, or the like). The output data may be data of the object detected from the image. For example, the electronic device 1 may be an application processor. The application processor may perform various types of computational processing. A neural processing unit (NPU) 12 included in the application processor may perform computational processing using an artificial neural network.

Referring to FIG. 1, the electronic device 1 may include a processor 10, random access memory (RAM) 20, a storage 30, a sensor unit 40, a communication module 50, and a bus 90 for performing communication thereof. The processor 10 may include a central processing unit (CPU) 11 and the NPU 12. The electronic device 1 may further include an input/output module, a security module, a power control device, and the like. Additionally, the electronic device 1 may further include various types of computation devices.

The CPU 11 controls a general operation of the electronic device 1. The CPU 11 may include a single-core processor or a multi-core processor. The CPU 11 may process or execute programs and/or data stored in the storage 30. For example, the CPU 11 may control a function of the NPU 12 by executing programs stored in the storage 30.

The NPU 12 may receive input data, perform an arithmetic operation by using an artificial neural network, and provide output data based on the arithmetic operation result. The NPU 12 may perform computational processing based on various types of networks such as a convolution neural network (CNN), a region with convolution neural network (R-CNN), a region proposal network (RPN), a recurrent neural network (RNN), a fully convolutional network, a long short-term memory (LSTM) network, and a classification network. However, the NPU 12 is not limited thereto and may perform various types of computational processing of simulating a human neural network.

The RAM 20 may temporarily store programs, data, or instructions. For example, programs and/or data stored in the storage 30 may be stored temporarily in the RAM 20 according to control of the CPU 11 or booting code. For example, the RAM 20 includes dynamic RAM (DRAM), static RAM (SRAM), synchronous DRAM (SDRAM), or the like.

The storage 30 is a storage space for storing data and may store an operating system (OS), various kinds of programs, and various kinds of data. The storage 30 may be DRAM but is not limited thereto. The storage 30 may include at least one of volatile memories or nonvolatile memories. The nonvolatile memories may include read-only memory (ROM), flash memory, phase-change RAM (PRAM), magnetic RAM (MRAM), resistive RAM (RRAM), ferroelectric RAM (FRAM), and the like. According to an embodiment, the storage 30 may be implemented by a hard disk drive (HDD), a solid-state drive (SSD), or the like.

The sensor unit 40 may collect information about an object sensed by the electronic device 1. For example, the sensor unit 40 may be an image sensor unit. In this case, the sensor unit 40 may include at least one image sensor. The sensor unit 40 may sense or receive an image signal from the outside of the electronic device 1 and convert the image signal into image data, i.e., an image frame. As another example, the sensor unit 40 may be a distance sensor unit. In this case, the sensor unit 40 may include at least one distance sensor. The distance sensor may include at least one of various types of sensing devices such as a light detection and ranging (LIDAR) sensor, a radio detection and ranging (RADAR) sensor, a time of flight (ToF) sensor, an ultrasonic sensor, and an infrared sensor. The LIDAR sensor and the RADAR sensor may be distinguished according to effective measurement distances. For example, the LIDAR sensor may be distinguished as a long-range LIDAR sensor and a short-range LIDAR sensor, and the RADAR sensor may be distinguished as a long-range RADAR sensor and a short-range RADAR sensor. The sensor unit 40 is not limited thereto. The sensor unit 40 may further include at least one of a magnetic sensor, a position sensor (e.g., GPS), an acceleration sensor, an atmospheric pressure sensor, a temperature/humidity sensor, a proximity sensor, and a gyroscope sensor but is not limited thereto. A function of each sensor may be intuitively inferred by those of ordinary skill in the art from a name thereof. Therefore, a detailed description thereof is omitted herein.

The communication module 50 may transmit and/or receive data of the electronic device 1. For example, the communication module 50 may communicate with an external target of the electronic device 1. In this case, the communication module 50 may perform communication by a vehicle to everything (V2X) scheme. For example, the communication module 50 may perform communication by vehicle to vehicle (V2V), vehicle to infrastructure (V2I), vehicle to pedestrian (V2P), and vehicle to nomadic devices (V2N) schemes. However, the communication module 50 is not limited thereto. The communication module 50 may transmit and receive data by various known communication schemes. For example, the communication module 50 may perform communication by a communication method including third-generation (3G), long term evolution (LTE), Bluetooth, Bluetooth low energy (BLE), ZigBee, near field communication (NFC), ultrasound, or the like. Additionally, the communication module 50 may perform both short-range communication and long-range communication.

According to an example embodiment of the inventive concept, the processor 10 may receive an input image, then the processor 10 may generate a plurality of images by down-sampling the input image. The plurality of images may have different sizes The size may indicate resolution. The processor 10 may identify the farthest object from an image with a relatively large size and identify the closest object from an image with a relatively small size. In this process, the processor 10 may mask a region remaining by excluding an object. Therefore, a computational amount of the processor 10 may be reduced by identifying an object based on a masking-excluded region.

Figure 2:
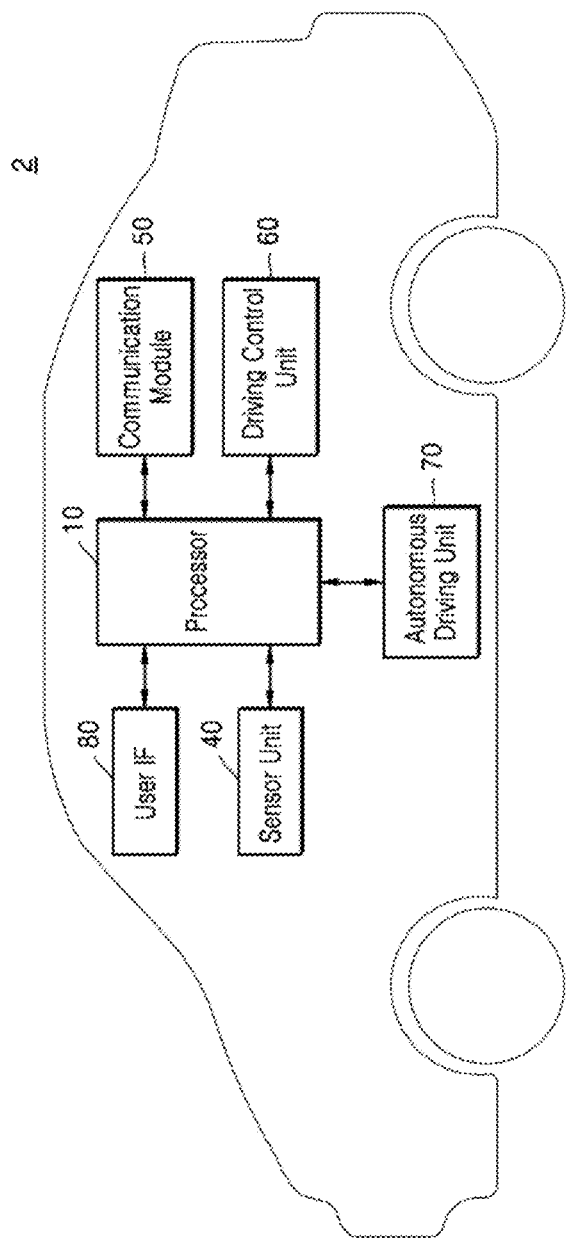
FIG. 2 is a block diagram of a driving assistant system according to an example embodiment of the inventive concept.

FIG. 2 is a block diagram of a driving assistant system 2 according to an example embodiment of the inventive concept. Hereinafter, a description will be made with reference to the reference signs of FIG. 1.

Referring to FIG. 2, the driving assistant system 2 may include the processor 10, the sensor unit 40, the communication module 50, a driving control unit 60, an autonomous driving unit 70, and a user interface (IF) 80. The processor 10, the sensor unit 40 and the communication module 50 are the same as or similar to those described above with reference to FIG. 1. Therefore, a description thereof is omitted herein.

According to an example embodiment of the inventive concept, the driving assistant system 2 may detect an object. Object detection is performed using information about an external environment acquired through the sensor unit 40. For example, the sensor unit 40 may capture an image and transmit the captured image to the processor 10. The processor 10 may detect an object (e.g., another vehicle) based on the captured image (hereinafter, input image) and control the driving control unit 60 and the autonomous driving unit 70. Described as an example, the processor 10 detects an object based on an input image, but the processor 10 is not limited thereto. For example, the processor 10 may detect an object based on depth information output from a distance sensor.

The driving control unit 60 may include a vehicle steering device and a throttle control device. The vehicle steering device is configured to control a driving direction of a vehicle. The throttle control device is configured to control acceleration and/or deceleration by controlling a motor or an engine of the vehicle. The driving control unit 60 may also include a brake device configured to control braking of the vehicle, an external lighting device, and the like.

The autonomous driving unit 70 may include a computing device configured to implement autonomous control of the driving control unit 60. For example, the autonomous driving unit 70 may include at least one of the components of the electronic device 1. The autonomous driving unit 70 may include a memory storing a plurality of program instructions and one or more processors configured to execute the program instructions. The autonomous driving unit 70 may be configured to control the driving control unit 60 based on a sensing signal output from the sensor unit 40. The user IF 80 may include various electronic devices and mechanical devices included in a driver's seat, a passenger seat, or the like, such as a display displaying a dashboard of a vehicle.

The processor 10 uses various pieces of sensing data such as an input image and depth information to detect an object. In this case, the processor 10 may use an artificial neural network for efficient computational processing. For example, the NPU 12 may perform a computation method to be described below with reference to FIG. 3.

Figure 3:
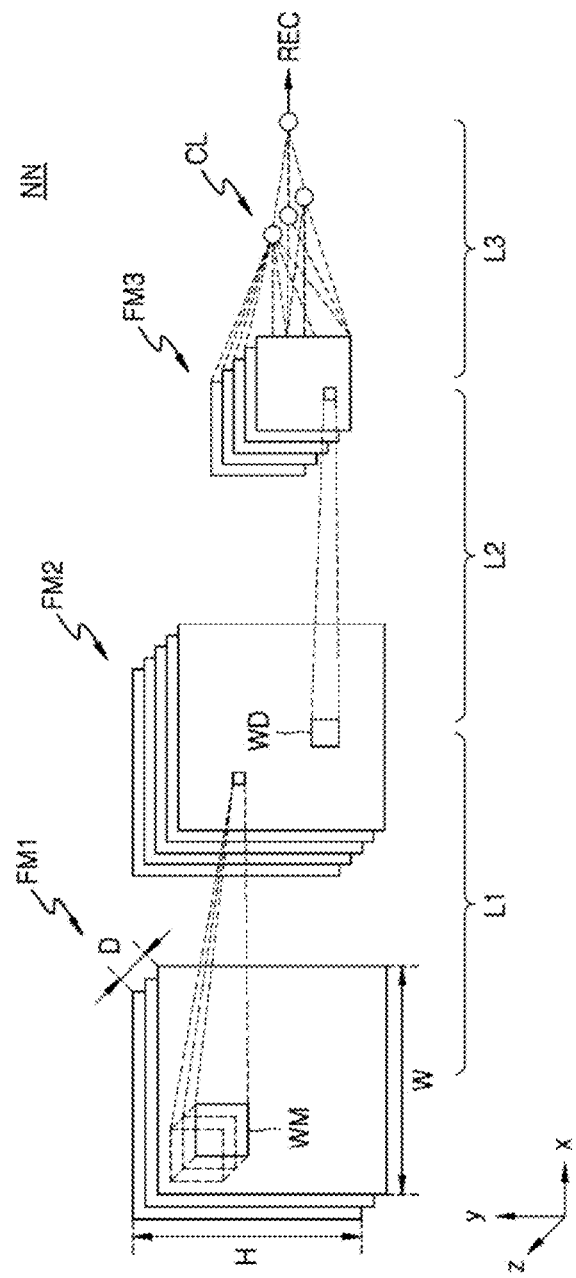
FIG. 3 illustrates an artificial neural network and computational processing using the artificial neural network.

FIG. 3 illustrates an artificial neural network NN and computational processing using the artificial neural network NN.

Referring to FIG. 3, the artificial neural network NN may include a plurality of layers, e.g., first to $n^{th}$ layers L1 to Ln. Each of the plurality of layers L1 to Ln may be a linear layer or a nonlinear layer. According to an embodiment of the inventive concept, at least one linear layer and at least one nonlinear layer may be combined and referred to as one layer. For example, a linear layer may include a convolution layer and a fully connected layer. A nonlinear layer may include a sampling layer, a pooling layer, and an activation layer.

For example, the first layer L1 may be a convolution layer and the second layer L2 may be a sampling layer. The artificial neural network NN may further include an activation layer and may further include a layer configured to perform another type of arithmetic operation.

Each of the plurality of layers L1 to Ln may receive, as an input featuremap, input image data or a featuremap generated in a previous layer and perform an arithmetic operation on the input featuremap, thereby generating an output featuremap. In this case, a featuremap indicates data representing various features of input data. First to third featuremaps FM1, FM2, and FM3 may have, for example, a two-dimensional (2D) matrix or 3D matrix format. The first to third featuremaps FM1 to FM3 may have a width (or column) W, a height (or row) H, and a depth D, respectively corresponding to an x-axis, a y-axis, and a z-axis on a coordinate system. Herein, the depth D may be referred to as the quantity of channels.

The first layer L1 may generate the second featuremap FM2 by convoluting the first featuremap FM1 and a weightmap WM. The weightmap WM may filter the first featuremap FM1 and may be referred to as a filter or a kernel. For example, a depth, i.e., the quantity of channels, of the weightmap WM is the same as a depth of the first featuremap FM1. Additionally, the same channels of the weightmap WM and the first featuremap FM1 may be convoluted. The weightmap WM may be shifted in a manner of traversing by using the first featuremap FM1 as a sliding window. A shifted amount may be referred to as "stride length" or "stride". During each shift, each weight value included in the weightmap WM may be multiplied by, and added to, pixel values in a region overlapping the first featuremap FM1. According to the convolution of the first featuremap FM1 and the weightmap WM, one channel of the second featuremap FM2 may be generated. Although FIG. 3 shows one weightmap WM, substantially a plurality of weightmaps may be convoluted with the first featuremap FM1 to generate a plurality of channels of the second featuremap FM2. In other words, the quantity of channels of the second featuremap FM2 may correspond to the quantity of weightmaps.

The second layer L2 may generate the third featuremap FM3 by changing a spatial size of the second featuremap FM2. For example, the second layer L2 may be a sampling layer. The second layer L2 may perform up-sampling or down-sampling. The second layer L2 may select a portion of data included in the second featuremap FM2. For example, a 2D window WD may be shifted on the second featuremap FM2 in a unit of a size of the window WD (e.g., 4*4 matrix), and a value of a particular position (e.g., first row first column) in a region overlapped with the window WD may be selected. The second layer L2 may output the selected data as data for the third featuremap FM3. As another example, the second layer L2 may be a pooling layer. In this case, the second layer L2 may select a maximum value of feature values (or a mean value of the feature values) in the region overlapped with the window WD on the second featuremap FM2. The second layer L2 may output the selected data as data for the third featuremap FM3.

As a result, the third featuremap FM3 with a changed spatial size from the second featuremap FM2 may be generated. The quantity of channels of the third featuremap FM3 may be the same as the quantity of channels of the second featuremap FM2. According to an example embodiment of the inventive concept, a sampling layer may have a faster arithmetic operation speed than a pooling layer. The sampling layer may increase quality of an output image (e.g., in terms of peak signal to noise ratio (PSNR)). For example, an arithmetic operation by a pooling layer may calculate a maximum value or a mean value. Therefore, the pooling layer may have a longer arithmetic operation time than a sampling layer.

According to an embodiment of the inventive concept, the second layer L2 is not limited to a sampling layer or a pooling layer. For example, the second layer L2 may be a convolution layer similar to the first layer L1. The second layer L2 may generate the third featuremap FM3 by convoluting the second featuremap FM2 and a weightmap. In this case, the weightmap on which the convolution operation has been performed in the second layer L2 may differ from the weightmap WM on which the convolution operation has been performed in the first layer L1.

An $N^{th}$ featuremap may be generated in an $N^{th}$ layer by passing through a plurality of layers, including the first layer L1 and the second layer L2. The $N^{th}$ featuremap may be input to a reconstruction layer located at a back end of the artificial neural network NN, from which output data is output. The reconstruction layer may generate an output image based on the $N^{th}$ featuremap. Alternatively, the reconstruction layer may receive a plurality of featuremaps. The plurality of featuremaps may include the $N^{th}$ featuremap, which may be the first featuremap FM1, the second featuremap FM2, and the like. Additionally, the plurality of featuremaps may generate an output image based on the plurality of featuremaps.

The third layer L3 may classify classes CL of the input data by combining features of the third featuremap FM3. Additionally, the third layer L3 may generate a recognition signal REC corresponding to a class. For example, the input data may be data of an image or video frame. In this case, the third layer L3 may recognize an object included in an image indicated by the frame data by extracting a class corresponding to the object based on the third featuremap FM3 provided from the second layer L2. The third layer L3 may then generate a recognition signal REC corresponding to the recognized object.

In an artificial neural network, layers of a lower level, such as convolution layers, may extract features of the lower level (e.g., an outline or gradient of a vehicle) from input data or an input featuremap. Layers of a higher level, such as a fully connected layer, may extract or detect features, i.e., class, of the higher level (e.g., a taillight, rear glass, or the like of a vehicle) from an input featuremap.

Figure 4:
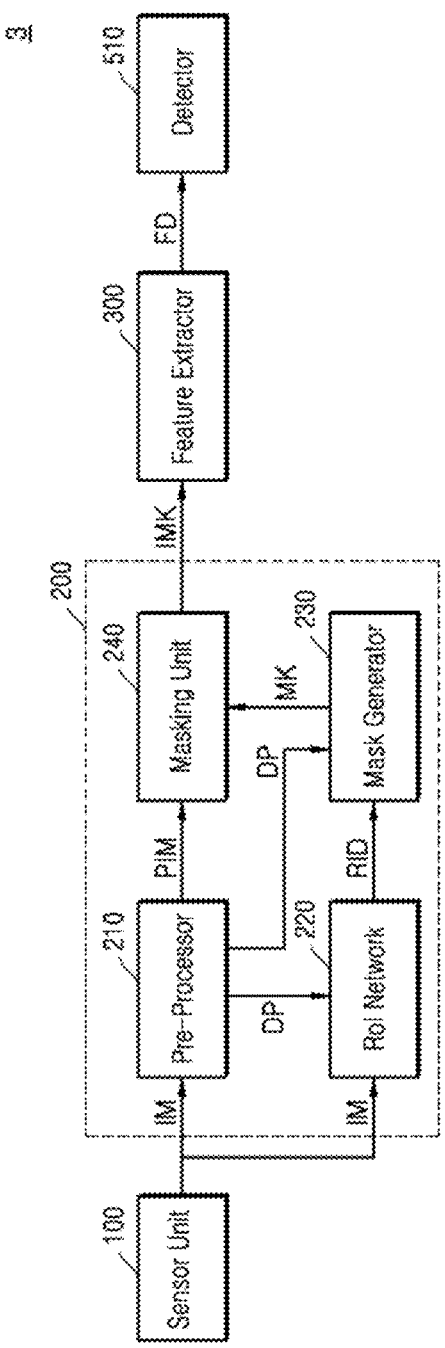
FIG. 4 is a block diagram of an electronic device according to an example embodiment of the inventive concept.

FIG. 4 is a block diagram of an electronic device 3 according to an example embodiment of the inventive concept.

Referring to FIG. 4, the electronic device 3 may include a sensor unit 100, an image processor 200, a feature extractor 300, and a detector 510. The image processor 200 may further include a pre-processor 210, a region of interest (RoI) network 220, a mask generator 230, and a masking unit 240. The electronic device 3 may be included as at least a partial configuration of the electronic device 1 described above with reference to FIGS. 1 and 2. For example, the image processor 200, the feature extractor 300, and the detector 510 of the electronic device 3 may be included in the processor 10, commands, instructions, or program code to perform operations and functions of the image processor 200, the feature extractor 300, and the detector 510 may be stored in the storage 30. The sensor unit 100 is the same as the sensor unit 40 described above with reference to FIGS. 1 and 2. Therefore, a detailed description thereof is omitted herein. Additionally, the electronic device 3 may be included as at least a partial configuration of the driving assistant system 2 described above with reference to FIG. 2. For example, the electronic device 3 may acquire an image of another vehicle from the sensor unit 100. The image processor 200 may perform image processing to detect the other vehicle. The feature extractor 300 may extract a feature of the image and the detector 510 may detect the other vehicle. For example, the electronic device 3 may be a driving assistant system for assisting with driving of a driver or for autonomous driving. Alternatively, the electronic device 3 may be included as a portion of a driving assistant system.

According to an example embodiment of the inventive concept, the sensor unit 100 may photograph a front view ahead and output an input image IM. The input image IM may include an object and a background. For example, the input image IM may be data about a 2D image of an RGB format but is not limited thereto. The sensor unit 100 may be referred to as a first sensor unit 100 to be distinguished from a sensor unit 520 to be described below with reference to FIG. 13. The sensor unit 520 may be referred to as a second sensor unit 520.

The image processor 200 may receive the input image IM, mask at least a partial region of the input image IM, and output a masked image IMK.

The pre-processor 210 may receive the input image IM, down-sample the input image IM, and generate and output a pyramid image PIM. For example, the pre-processor 210 may generate a first pyramid image by down-sampling horizontal and vertical lengths of the input image IM at a certain rate. The pre-processor 210 may then generate a second pyramid image by down-sampling the first pyramid image at the certain rate again. As another example, the first pyramid image may be generated by down-sampling the input image IM once. The second pyramid image may be generated by down-sampling the input image IM twice. For example, the pre-processor 210 may generate a plurality of pyramid images PIM derived from the input image IM with gradually reduced sizes, compared to the input image IM.

The pre-processor 210 may mask a region remaining by excluding an object of interest (e.g., at least one of another vehicle, a road, or a pedestrian) from the input image IM and generate a pyramid image PIM based on the masked image. For example, although not shown, the pre-processor 210 may receive RoI information RID and mask, based on RoI information RID, the data of the region remaining by excluding the object of interest.

The pre-processor 210 may receive the input image IM, then acquire and output depthmap DP including depth data about the object and the background included in the input image IM. The depth data may include depth values indicating, for example, a distance from a user or an own vehicle to an object or another vehicle. The depthmap DP indicates a map including, for example, depth values from the sensor unit 100 to another vehicle and a background. For example, the sensor unit 100 may include a stereo camera. In this case, the input image IM may include a left-eye image and a right-eye image. The pre-processor 210 may calculate parity by using the left-eye image and the right-eye image and acquire the depthmap DP based on the calculated parity. However, the sensor unit 100 is not limited thereto, and the sensor unit 100 may be a combination of a single camera and a distance sensor, rather than the stereo camera. For example, the sensor unit 100 may output 2D information by using the single camera and output 3D information by using the distance sensor. In this case, the pre-processor 210 may acquire the depthmap DP related to both the object and the background, which are included in the input image IM, by using the 2D information and the 3D information. The depthmap DP may be generated by the pre-processor 210 and a depth generator (250 of FIG. 5) to be described below with reference to FIG. 5. For example, the depth generator 250 may generate the depthmap DP by using parity of a stereo image received from the sensor unit 100. Alternatively, the depthmap DP may be generated by the sensor unit 100 to be described below with reference to FIG. 6. For example, the sensor unit 100 may output a stereo image and also output the depthmap DP based on the stereo image.

The RoI network 220 may identify, as an RoI, a partial region included in the input image IM based on the input image IM and output RoI information RID including data about the RoI. For example, the RoI information RID may include at least one of 2D information of the RoI (e.g., a partial region of the input image IM) and 3D information of the RoI (e.g., partial data of the depthmap DP). For example, the RoI network 220 may calculate a depth value based on parity of the left-eye image and the right-eye image when the input image IM includes a left-eye image and a right-eye image. The RoI network 220 may then output RoI information RID, which may include the depth value. As another example, the RoI network 220 may identify an RoI from the input image IM based on the depthmap DP. For example, the RoI network 220 may identify elements used for driving, based on a plurality of depth values included in the depthmap DP. For example, when the electronic device 3 is included in a driving assistant system, the RoI network 220 may analyze the input image IM and/or the depthmap DP to identify, as an RoI, a region that may include information used for a vehicle to drive. For example, the RoI may be a region including a road on which a vehicle drives, another vehicle, a signal light, a crosswalk, and the like. The RoI may include a plurality of regions.

The mask generator 230 may generate and output a plurality of pieces of mask data MK with different average depths, based on the RoI information RID and the depthmap DP. The mask generator 230 may generate and output a plurality of pieces of mask data MK in which a region, except for an RoI, is masked in a pyramid image PIM, based on the RoI information RID.

Mask data MK may be data for masking a region except for a meaningful region of the pyramid image PIM. For example, as the quantity of down-sampling times for generating a pyramid image PIM is smaller, the meaningful region may indicate an image region representing a farther distance. On the contrary, as the quantity of down-sampling times for generating a pyramid image PIM is larger, the meaningful region may indicate an image region representing a closer distance. For example, when a size of a pyramid image PIM, to which mask data MK is to be applied is relatively large, the mask data MK may include data for masking a region of a relatively close distance. On the contrary, when a size of a pyramid image PIM to which mask data MK is to be applied is relatively small, the mask data MK may include data for masking a region of a relatively far distance.

The mask generator 230 may receive the depthmap DP and the RoI information RID and generate a plurality of pieces of mask data MK according to depth values. The mask generator 230 may identify, as an RoI, a partial region included in the depthmap DP based on the RoI information RID and generate mask data MK by excluding depth values of the RoI. Therefore, the RoI of the mask data MK may include meaningful depth values and data of a region except for the RoI of the mask data MK may include a null value or an invalid value.

The mask generator 230 may divide the RoI in the depthmap DP into a plurality of regions and output mask data MK including each of the plurality of regions. For example, the mask data MK may include depth values of a partial region of the RoI in the depthmap DP. The mask data MK will be described below in detail with reference to FIG. 7.

The masking unit 240 may generate and output masked images IMK representing different average distances based on the plurality of pyramid images PIM and the plurality of pieces of mask data MK. An average distance indicates an average of distances from the sensor unit 100 to a real object corresponding to pixels represented on an image. In other words, the masking unit 240 may apply the plurality of pieces of mask data MK to the plurality of pyramid images PIM, respectively.

A masked image IMK may represents a partial region of the input image IM or a pyramid image PIM. For example, a first masked image (e.g., IMK1 of FIG. 9) may include a first region (e.g., C1 of FIG. 9), wherein the first region is a portion of a first pyramid image (e.g., PIM1 of FIG. 9). Additionally, the first masked image may include a second masked image (e.g., IMK2 of FIG. 9) that may include a second region (e.g., C2 of FIG. 9), wherein the second region is a portion of a second pyramid image (e.g., PIM2 of FIG. 9). In this case, contexts formed by the first region C1 and the second region C2 may differ from each other. For example, the first region C1 may include a vanishing point and an end portion of a road, whereas the second region C2 may include an intermediate portion of the road and a vehicle ahead. Image context may indicate information about a situation indicated by an image. For example, images captured at the same time may have the same context.

The masking unit 240 may mask a region remaining by excluding the first region C1 in the first pyramid image PIM1 and mask a region remaining by excluding the second region C2 in the second pyramid image PIM2. The masking unit 240 may output a masked first pyramid image (i.e., the first masked image) and a masked second pyramid image (i.e., the second masked image).

The first region C1 and the second region C2 include regions of different distances but they may not be exclusive of each other. For example, the first region C1 and the second region C2 may include an overlapped region. For example, a partial image (e.g., a particular portion of a road) included in the first region C1 may also be included in the second region C2. Additionally, at least some of the plurality of pieces of mask data MK may mask overlapped regions in pyramid images PIM. When the first region C1 and the second region C2 do not overlap each other, a partial object included in a pyramid image PIM may be omitted. To prevent this phenomenon, the masking unit 240 may mask a pyramid image PIM so as to overlap a boundary portion of different regions.

The mask generator 230 may write information indicating a first pyramid image on a header portion of first mask data such that the first mask data is applied to a first pyramid image wherein the first pyramid is the largest pyramid image. Therefore, the masking unit 240 may mask the first pyramid image by using the first mask data. As another example, the masking unit 240 may identify that the first mask data has a size corresponding to the first pyramid image and mask the first pyramid image by using the first mask data. For example, when the size of the first mask data corresponds to a size of a partial region of the first pyramid image, the masking unit 240 may apply the first mask data to the first pyramid image.

The feature extractor 300 may receive the masked images IMK and output feature data FD of each masked image IMK. For example, the feature data FD may be a featuremap (e.g., FM3), the class CL, or the recognition signal REC described above with reference to FIG. 3. For example, the feature data FD may include various forms of data including a feature of a non-masked region in the input image IM or a pyramid image PIM.

The feature extractor 300 may extract feature values from masked images IMK including different contexts, respectively. For example, the first masked image may include a context of a far distance from an observer, such as a vanishing point. In this case, the image processor 200 may down-sample the input image IM a relatively small number of times for a far object such that more pixels related to the far object are included. On the contrary, the second masked image may include a context of a close distance from the observer. For the efficiency of computational processing and the efficiency of machine learning, the image processor 200 may down-sample the input image IM a relatively large number of times. Therefore, data amounts included in the first masked image and the second masked image may be similar within a small error range. As a result, when machine learning is performed using the first masked image and the second masked image, the efficiency of learning may be increased using substantially the same sized kernel.

The detector 510 may receive the feature data FD and identify information about the object or background included in the input image IM based on the feature data FD. For example, the detector 510 may detect the object (e.g., another vehicle) included in the input image IM and detect various pieces of information about the object. The various pieces of information may include 3D information including, for example, a 3D bounding box, a shape of the object, a distance to the object, a position of the object, and the like and 2D information including an edge forming the object and the like.

Figure 5:
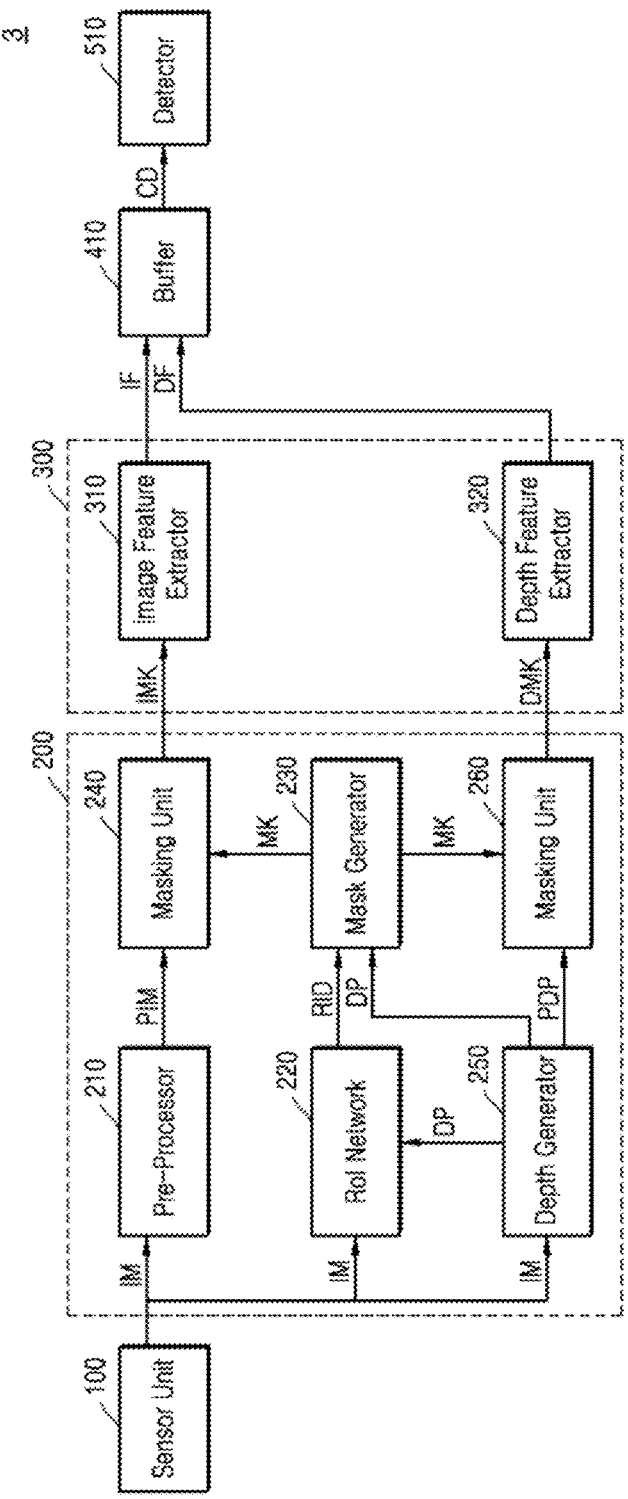
FIG. 5 is a block diagram of an electronic device according to an example embodiment of the inventive concept.

FIG. 5 is a block diagram of the electronic device 3 according to an example embodiment of the inventive concept.

The electronic device 3 may include the sensor unit 100, the image processor 200, the feature extractor 300, a buffer 410, and the detector 510, the image processor 200 may further include the pre-processor 210, the RoI network 220, the mask generator 230, the masking unit 240, a depth generator 250, and a masking unit 260, and the feature extractor 300 may further include an image feature extractor 310 and a depth feature extractor 320. The electronic device 3 may be included as at least a partial configuration of the electronic device 1 described above with reference to FIGS. 1 and 2. Hereinafter, a description made above with reference to FIGS. 1 to 4 is omitted.

The image processor 200 may receive an input image IM and output a masked image IMK and/or a masked depthmap DMK. The masked depthmap DMK may be obtained by masking a partial region in a depthmap related to a front view ahead.

The pre-processor 210 may receive the input image IM, down-sample the input image IM, and generate and output a pyramid image PIM. For example, the pre-processor 210 described above with reference to FIG. 4 may output the depthmap DP based on the input image IM, but according to an embodiment of the inventive concept, the pre-processor 210 may generate and output a pyramid image PIM without generating and outputting the depthmap DP, based on the input image IM The depth generator 250 may receive the input image IM and output the depthmap DP. For example, the pre-processor 210 may not output the depthmap DP. The depth generator 250 may output the depthmap DP. For example, the depth generator 250 may provide the depthmap DP to the RoI network 220 and the mask generator 230. For example, the sensor unit 100 may be a stereo camera. In this case, the input image IM may include a left-eye image and a right-eye image. The depth generator 250 may detect parity by using the left-eye image and the right-eye image and acquire the depthmap DP based on the detected parity The depth generator 250 may output a plurality of pyramid depthmaps PDP based on the input image IM. A relationship between the plurality of pyramid depthmaps PDP and the depthmap DP may be similar to a relationship between the plurality of pyramid images PIM and the input image IM. For example, the depth generator 250 may generate a first pyramid depthmap by down-sampling horizontal and vertical lengths of the depthmap DP at a certain rate and generate a second pyramid depthmap by down-sampling the first pyramid depthmap at the certain rate again. As another example, the first pyramid depthmap may be generated by down-sampling the depthmap DP once. The second pyramid depthmap may be generated by down-sampling the depthmap DP twice. For example, the depth generator 250 may generate the plurality of pyramid depthmaps PDP with gradually reduced sizes compared to the depthmap DP.

The mask generator 230 may provide a plurality of pieces of mask data MK to the masking unit 240 and the masking unit 260 based on the depthmap DP and RoI information RID.

The masking unit 240 may output masked images IMK based on the plurality of pyramid images PIM and the plurality of pieces of mask data MK. The masking unit 260 may output masked depthmaps DMK based on the plurality of pyramid depthmaps PDP and the plurality of pieces of mask data MK.

A masked depthmap DMK may represent a partial region of the depthmap DP or a pyramid depthmap PDP. For example, a first masked depthmap may include a first region, wherein the first region is a portion of a first pyramid depthmap. Additionally, the first masked depthmap may include a second masked depthmap that may include a second region, wherein the second region is a portion of a second pyramid depthmap. In this case, contexts formed by the first region and the second region may differ from each other.

The feature extractor 300 may output image feature data IF based on the masked images IMK and output depth feature data DF based on the masked depthmaps DMK. For example, the image feature data IF and the depth feature data DF may be a featuremap (e.g., FM3), the class CL, or the recognition signal REC described above with reference to FIG. 3. For example, the image feature extractor 310 may extract feature values of the masked images IMK and provide the image feature data IF to the buffer 410 based on the extracted feature values. Likewise, the depth feature extractor 320 may extract features values of the masked depthmaps DMK and provide the depth feature data DF to the buffer 410 based on the extracted feature values.

The buffer 410 may receive the image feature data IF and the depth feature data DF, perform concatenation based on the image feature data IF and the depth feature data DF, and output concatenated data CD. For example, the buffer 410 may concatenate the image feature data IF and the depth feature data DF into a single piece of feature data. As another example, the buffer 410 may concatenate the concatenated single piece of feature data and down-sampled feature data (IF_2D of FIG. 12) to be described below with reference to FIG. 12 once more. For example, the concatenated data CD may be data in a form in which various pieces of feature data are concatenated.

The detector 510 may receive the concatenated data CD, analyze feature values of the concatenated data CD, and detect an object (e.g., another vehicle or the like) included in the input image IM. For example, the detector 510 may include various activation layers (e.g., ReLU (Rectified Linear Unit)) which may be implemented in an artificial neural network model. As another example, the detector 510 may include various object recognition models which are recognizable an object based on the feature values of the concatenated data CD.

Figure 6:
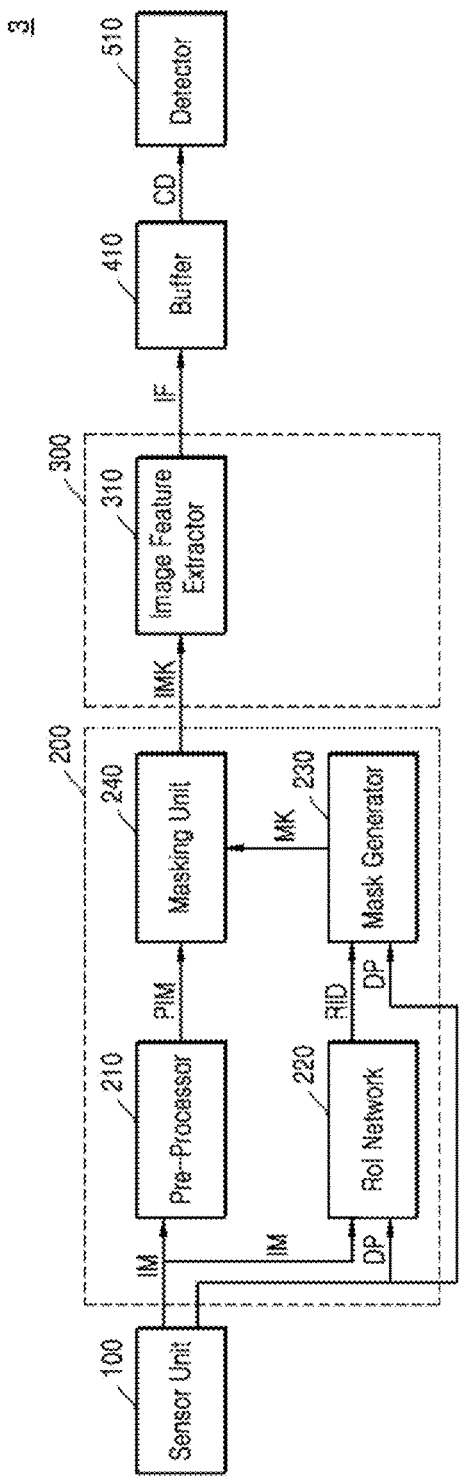
FIG. 6 is a block diagram of an electronic device according to an example embodiment of the inventive concept.

FIG. 6 is a block diagram of the electronic device 3 according to an example embodiment of the inventive concept.

Referring to FIG. 6, the electronic device 3 may include the sensor unit 100, the image processor 200, the feature extractor 300, the buffer 410, and the detector 510, the image processor 200 may further include the pre-processor 210, the RoI network 220, the mask generator 230, and the masking unit 240. The feature extractor 300 may further include the image feature extractor 310. Hereinafter, a description made above with reference to FIGS. 4 to 5 is omitted.

According to an example embodiment of the inventive concept, the sensor unit 100 may include a distance sensor capable of directly acquiring 3D information. For example, the distance sensor may sense distance information, acquire a depth value, and be implemented by a LIDAR, RADAR, or ToF sensor or the like. Additionally, the sensor unit 100 may include an image sensor capable of capturing a 2D image. The sensor unit 100 may output an input image IM, wherein the input image IM is a 2D image and/or a depthmap DP, including depth values.

The RoI network 220 may identify, as RoIs, at least some of regions in the depthmap DP. For example, the RoI network 220 may identify, as an RoI, a region including elements (e.g., a vehicle ahead, a road, or a pedestrian) used for driving of a vehicle. For example, the RoI network 220 may analyze a plurality of depth values included in the depthmap DP and identify, as an RoI, a region including depth values identified as a vehicle ahead.

The mask generator 230 may output mask data MK based on RoI information RID including the depth values of the RoI The mask data MK will be described below in detail with reference to FIG. 7.

The buffer 410 may receive image feature data IF and output concatenated data CD. For example, the image feature data IF may include feature values of a plurality of masked images IMK masked according to distances. For example, the image feature data IF may include first image feature data and second image feature data. The first image feature data may include feature values representing objects of relatively close distances. The second image feature data may include feature values representing objects of relatively far distances. The buffer 410 may concatenate the first image feature data and the second image feature data and output the concatenated data CD to the detector 510. The detector 510 may identify the object included in the input image IM based on the concatenated data CD.

Figure 7:
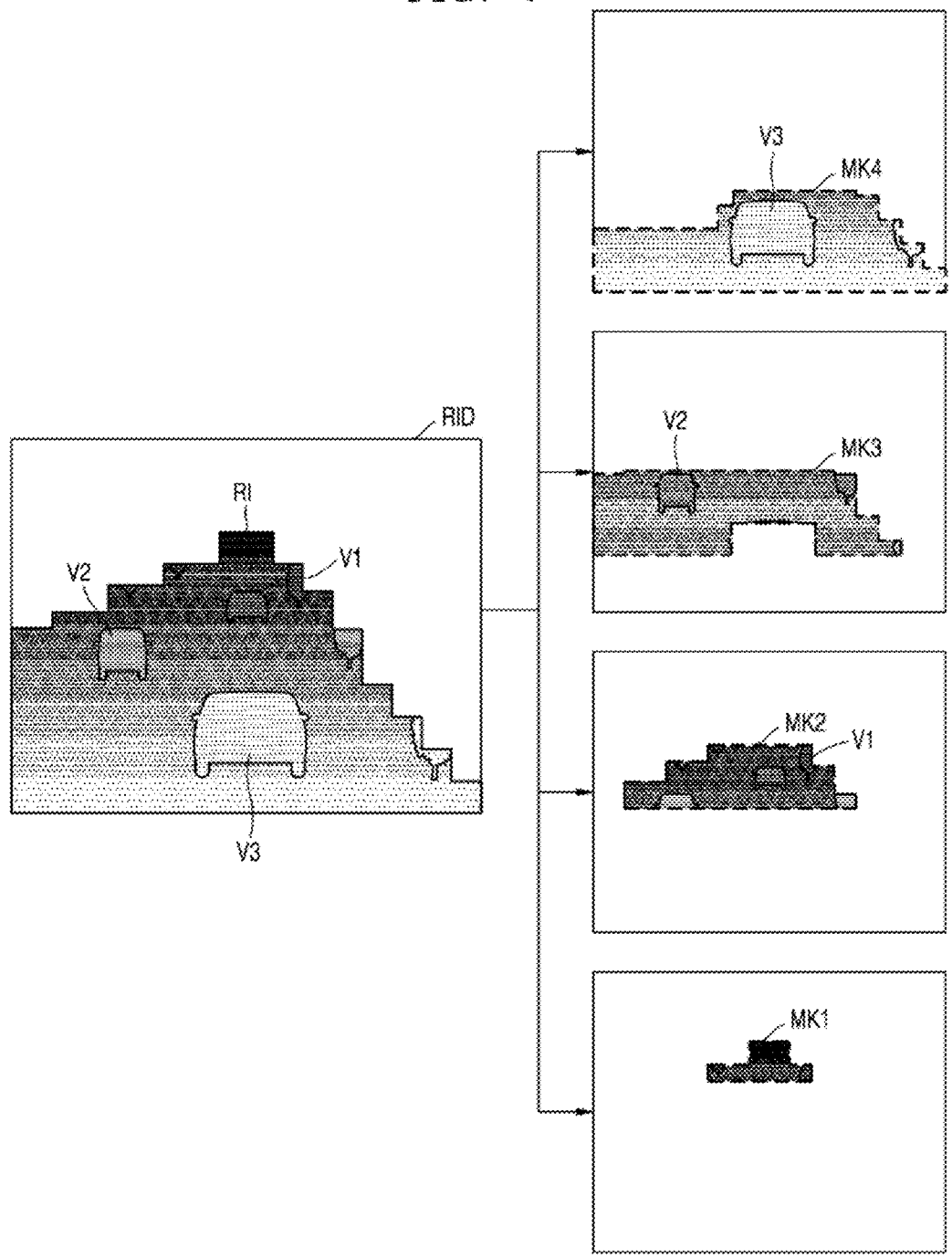
FIGS. 7 and 8 illustrate region of interest (RoI) information and mask data according to an example embodiment of the inventive concept.
Figure 8:
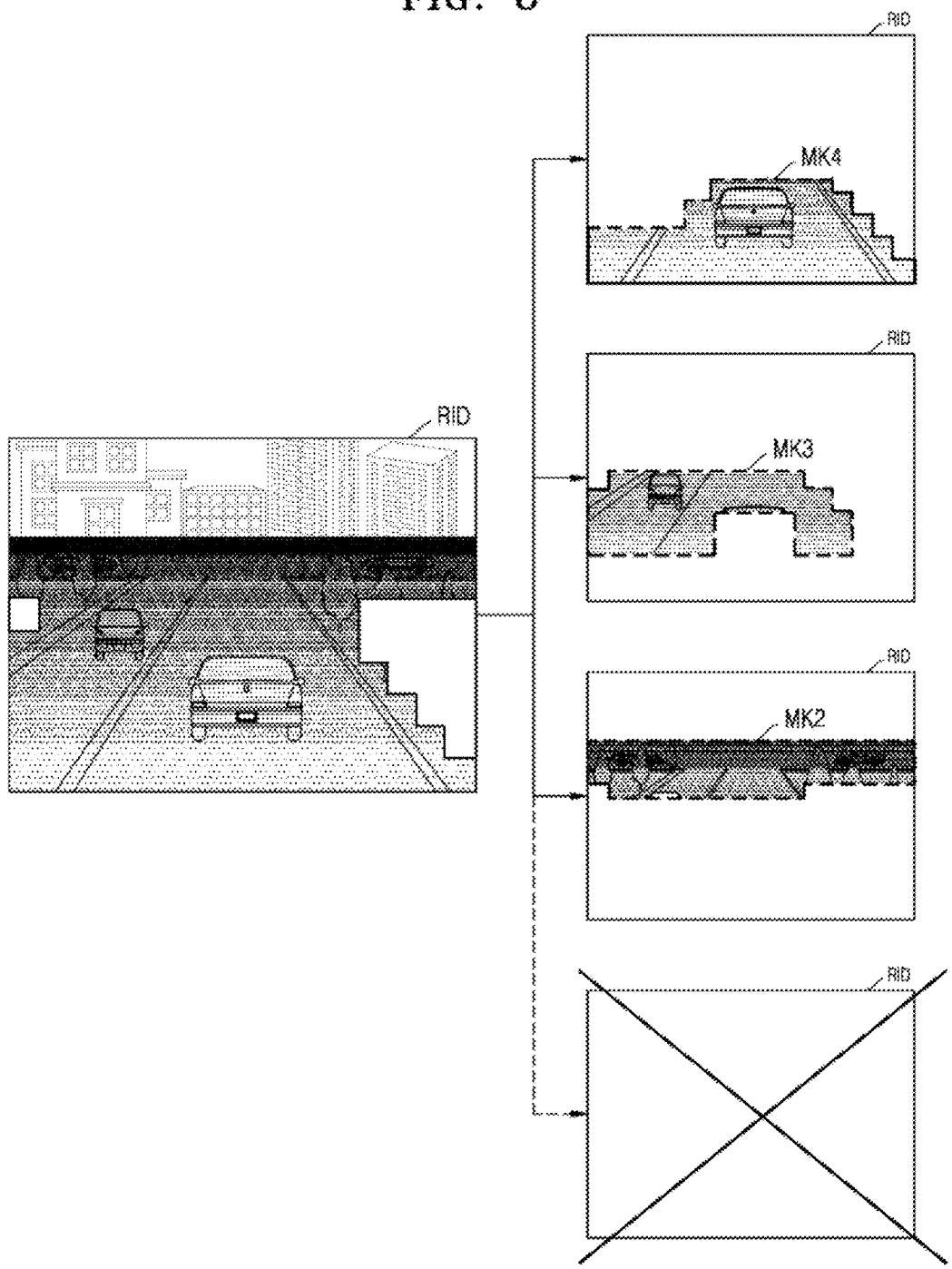

FIGS. 7 and 8 illustrate ROI information and mask data according to an example embodiment of the inventive concept. Hereinafter, a description refers to the reference signs of FIGS. 4 to 6.

Referring to FIGS. 7 and 8, the RoI network 220 may generate ROI information RID based on an input image IM and/or a depthmap DP. As described above, the depthmap DP may be acquired by the pre-processor 210, the sensor unit 100, or the depth generator 250. For example, the ROI information RID may include depth values of the depthmap DP. More particularly, the ROI information RID may include depth values of an RoI RI. Referring to FIGS. 7 and 8, the ROI information RID may include respective depth values of a third vehicle V3 closest to the sensor unit 100, a second vehicle V2 farther than the third vehicle V3, and a first vehicle V1 farther than the second vehicle V2. Additionally, the ROI information RID may include depth values of a road.

The mask generator 230 may generate a plurality of pieces of mask data, e.g., first to fourth mask data MK1 to MK4 based on the ROI information RID. The mask generator 230 may divide the ROI information RID for each certain depth section and generate the plurality of pieces of mask data MK1 to MK4 based on the divided ROI information RID.

According to an example embodiment of the inventive concept, an average of depth values included in first mask data MK1 may be greater than an average of depth values included in second mask data MK2. As another example, the depth values included in the first mask data MK1 may be greater than the depth values included in the second mask data MK2. As another example, some depth values included in the first mask data MK1 may be greater than the depth values included in the second mask data MK2.

According to an example embodiment of the inventive concept, the first mask data MK1 may include an object (e.g., a vanishing point or the horizon) farthest from the sensor unit 100. The second mask data MK2 may include an object (e.g., the first vehicle V1) closer than the object included in the first mask data MK1. Third mask data MK3 may include an object (e.g., the second vehicle V2) closer than the object included in the second mask data MK2. Fourth mask data MK4 may include an object (e.g., the third vehicle V3) closer than the object included in the third mask data MK3.

Referring to FIG. 8, the RoI network 220 may generate ROI information RID including depth values of vehicles and depth values of a road or including image information of the vehicles and the road. The mask generator 230 may generate the first mask data MK1 so that it does not include a depth value greater than a threshold depth value. In other words, the mask generator 230 may the provide the mask data MK2 to Mk4 except for the first mask data MK1. In some cases, a front view ahead, which is photographed by the sensor unit 100, may not include a vanishing point. For example, as shown in FIG. 8, buildings may be located at a certain distance from the sensor unit 100. Thus, in some cases, no image or distance information of a distance farther than the certain distance exists. Therefore, the mask generator 230 may not generate the first mask data MK1.

According to an example embodiment of the inventive concept, the mask generator 230 may generate edge information corresponding to some regions of the input image IM based on the RoI information RID. The plurality of pieces of mask data MK1 to MK4 may not include depth values and include the edge information. For example, the edge information may indicate boundary information represented by an outline (dashed line) of the mask data MK1 to MK4 shown in FIGS. 7 and 8. The masking unit 240 may apply the mask data MK1 to MK4, including the edge information to pyramid images PID and generate masked images IMK. The generation of the masked images IMK will be described below in detail with reference to FIG. 9.

Figure 9:
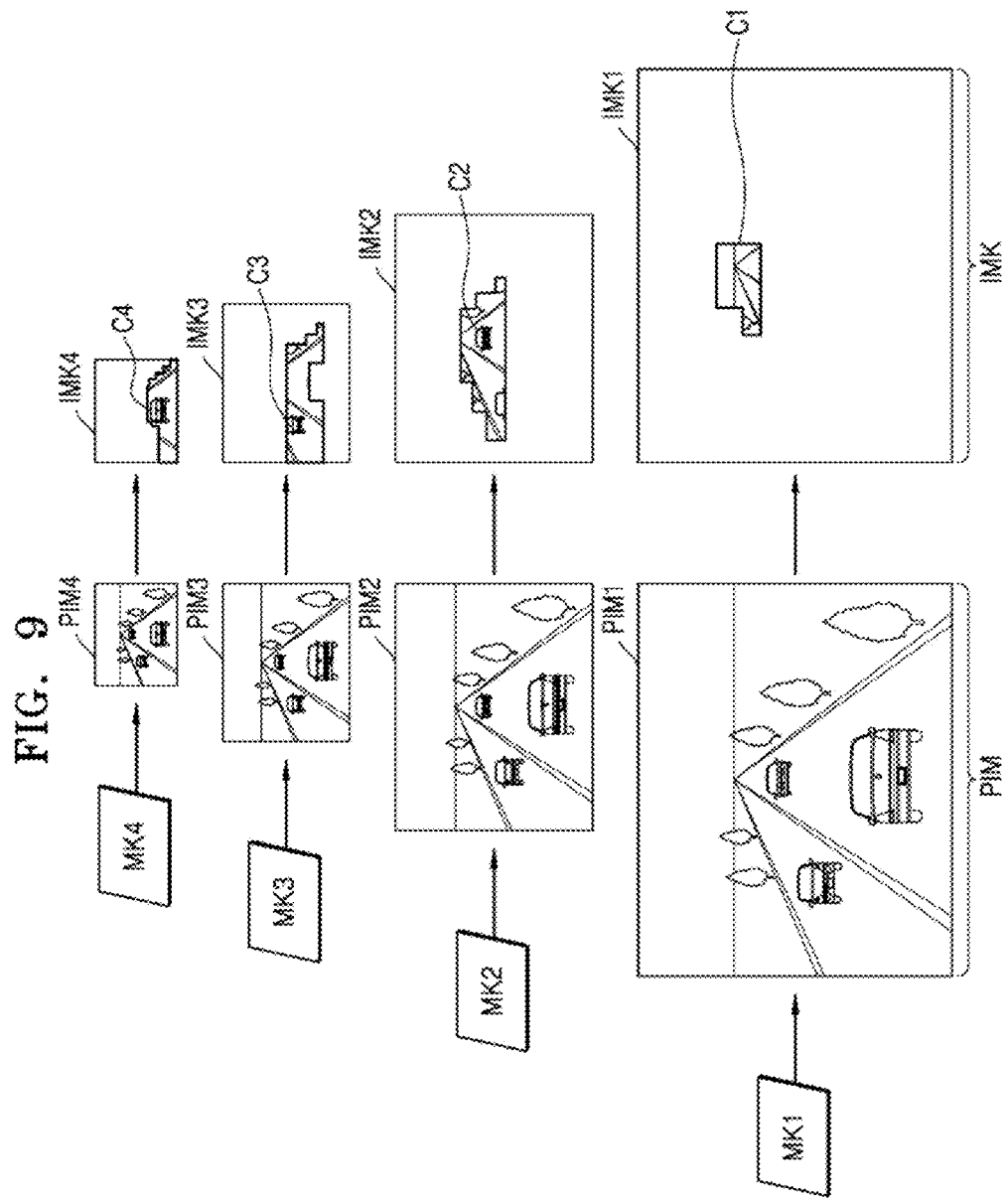
FIG. 9 illustrates an operation of masking pyramid images and generating masked images, according to an example embodiment of the inventive concept.

FIG. 9 illustrates an operation of masking pyramid images and generating masked images, according to an example embodiment of the inventive concept. Hereinafter, a description refers to the reference signs of FIGS. 4 to 6.

According to an example embodiment of the inventive concept, the masking unit 240 may apply the first to fourth mask data MK1 to MK4 to first to fourth pyramid images PIM1 to PIM4, respectively. The masking unit 240 may mask partial regions of the first to fourth pyramid images PIM1 to PIM4 based on the first to fourth mask data MK1 to MK4, respectively. In this case, contexts included in the first to fourth pyramid images PIM1 to PIM4 may be substantially the same. Therefore, sizes of the first to fourth pyramid images PIM1 to PIM4 thereof may differ from each other. The masking unit 240 may generate first to fourth masked images IMK1 to IMK4 in which the first to fourth pyramid images PIM1 to PIM4 are masked, respectively. The first to fourth masked images IMK1 to IMK4 may indicate different contexts. For example, the first masked image IMK1 may include a context of the farthest distance. Additionally, the fourth masked image IMK4 may include a context of the closest distance. The first to fourth mask data MK1 to MK4 may include edge information. The masking unit 240 may represent partial regions of the first to fourth pyramid images PIM1 to PIM4 and mask the remaining regions. For example, the masking unit 240 may generate the first masked image IMK1, including a context inside an edge, based on edge information included in the first mask data MK1.

The first masked image IMK1 includes a first region C1, wherein the first region C1 is a portion of the first pyramid image PIM1. The second masked image IMK2 includes a second region C2, wherein the second region C2 is a portion of the second pyramid image PIM2. The third masked image IMK3 includes a third region C3, wherein the third region C3 is a portion of the third pyramid image PIM3. The fourth masked image IMK4 includes a fourth region C4, wherein the fourth region C4 is a portion of the fourth pyramid image PIM4. Each of the plurality of regions C1 to C4 may be a partial region of a pyramid image PIM which is not masked by the plurality of pieces of mask data MK1 to MK4.

According to an example embodiment of the inventive concept, the feature extractor 300 may extract a feature value of the first region C1 from the first parameter image PIM1 and skip a feature extraction operation for the remaining region. For example, the first masked image IMK1 may be an image representing the first region C1 of the first parameter image PIM1. The feature extractor 300 may extract a feature in the first region C1 and skip an operation of extracting a feature from the remaining region of the first parameter image PIM1, even when there is data of the remaining region.

Thus, according to an embodiment of the inventive concept, a method of image processing may comprise receiving input data including image data and distance data corresponding to the image data; generating a plurality of down-sampled images (e.g., pyramid images PIM through PIM4) based on the image data, wherein each of the plurality of down-sampled images corresponds to a different image resolution; generating a plurality of image masks (e.g., mask data MK1 through MK4) based on the distance data, wherein each of the plurality of image masks corresponds to a different average distance value; generating a plurality of masked images (e.g., masked images IMK1 through IMK4), wherein each of the plurality of masked images is based on one of the plurality of down-sampled images and one of the plurality of image masks; generating feature data based on the plurality of masked images; and detecting an object based on the feature data.

For example, the method may identify an RoI including a road on which a vehicle is travelling, and the detected object may be another vehicle travelling on the road. By down sampling the image data, higher resolutions may be used for regions where the increased resolution may improve object detection (e.g., for higher distances in the RoI) and a reduced resolution may be used for identifying closer objects in the RoI This may reduce the processing power needed to achieve the desired level of real-time object detection.

Figure 10A:
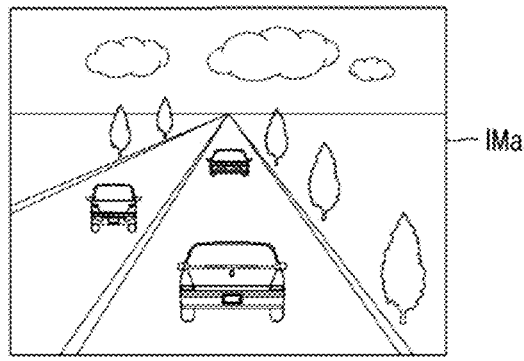
FIGS. 10A, 10B and 10C illustrate an image processing operation of a pre-processor, according to an example embodiment of the inventive concept.
Figure 10B:
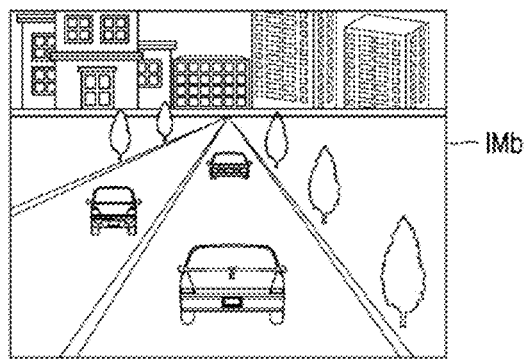
Figure 10C:
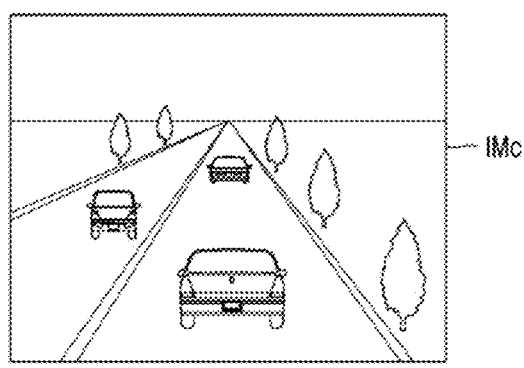

FIGS. 10A, 10B, and 10C illustrate an image processing operation of a pre-processor, according to an example embodiment of the inventive concept. Hereinafter, a description refers to the reference signs of FIGS. 4 to 6.

Referring to FIGS. 10A, 10B, and 10C, the sensor unit 100 may photograph a front view ahead and output an input image IM. The input image IM may include a first input image IMa and a second input image IMb. The first and second input images IMa and IMb may be obtained by photographing different front views ahead. For example, the sensor unit 100 may photograph a front view ahead, which includes a vanishing point. The sensor unit 100 may also generate the first input image Ima. The sensor unit 100 may photograph a front view ahead, which does not include a vanishing point, and generate the second input image IMb. The sky in the first input image IMa and the buildings in the second input image IMb may not be elements used for driving of a vehicle. Therefore, the RoI network 220 may receive the second input image IMb, delete data of a non-RoI region (e.g., a region including buildings), and generate a corrected image IMc. As another example, the RoI network 220 may receive the first input image IMa, delete data of a non-RoI region (e.g., a region including the sky), and generate another corrected image. In this case, a computational amount of the electronic device 3, which is used for image processing, may be reduced. Additionally, the electronic device 3 may accurately identify objects used for driving and prevent, in advance, an identification of unnecessary objects (e.g., the buildings in the second input image IMb), thereby enabling driving stability.

Figure 11A:
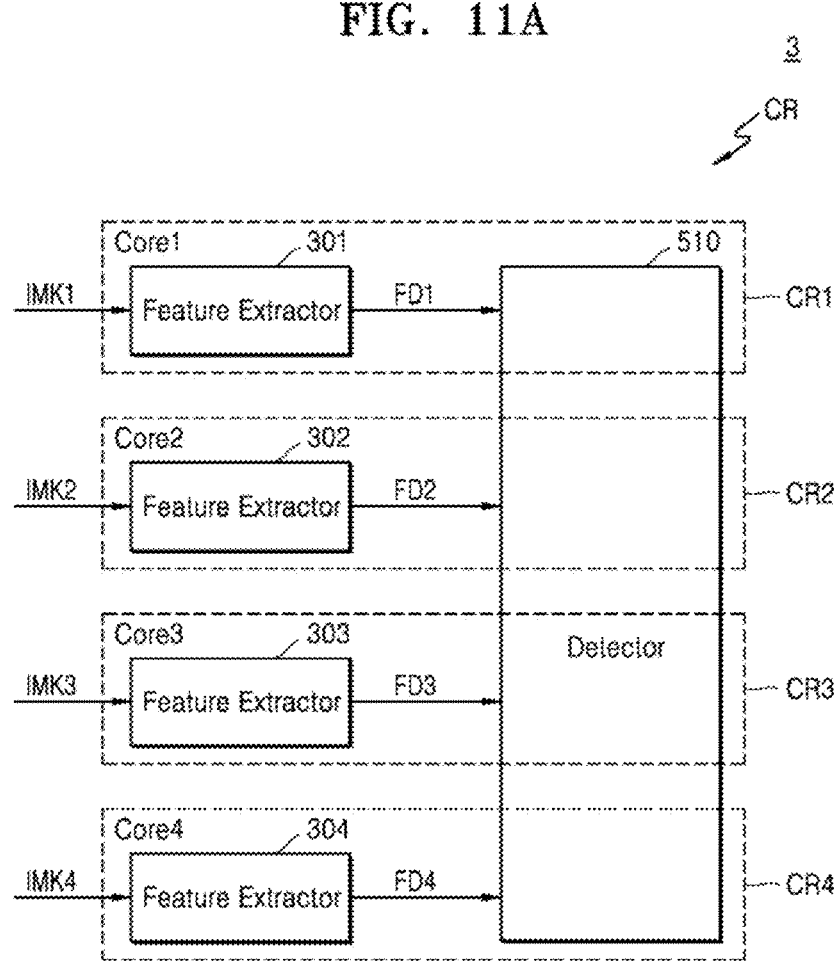
FIGS. 11A and 11B are block diagrams for describing a feature extractor and a core unit, according to an example embodiment of the inventive concept.
Figure 11B:
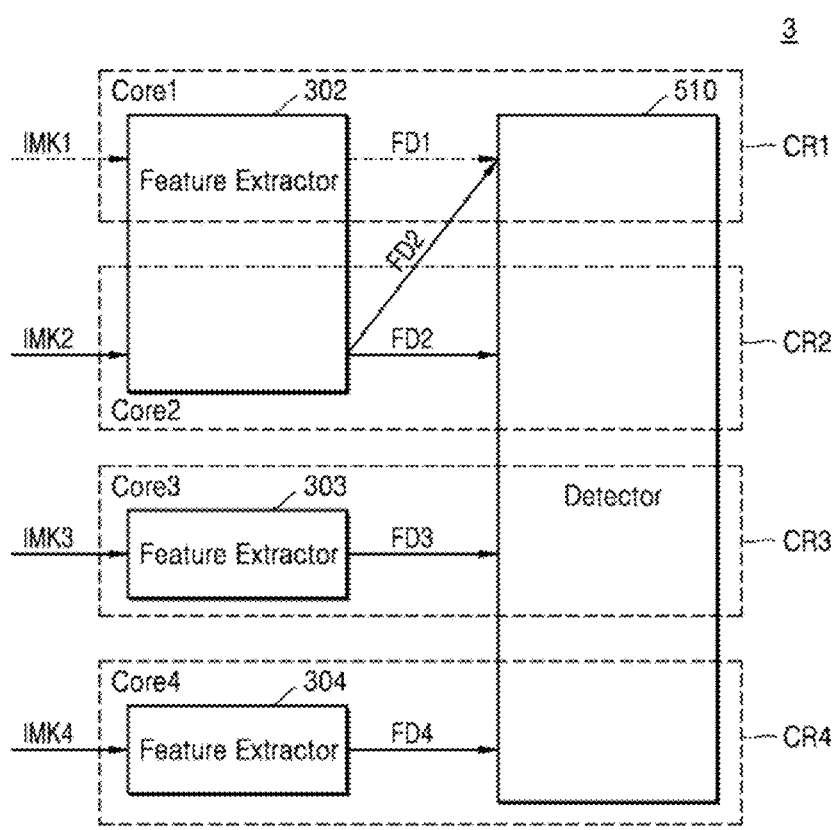

FIGS. 11A and 11B are block diagrams for describing a feature extractor and a core unit, according to an example embodiment of the inventive concept. Hereinafter, a description refers to the reference signs of FIGS. 4 to 6 and 9.

Referring to FIG. 11A, the electronic device 3 may include a core unit CR, and the core unit CR may include a plurality of cores, such as first to fourth cores CR1 to CR4. The plurality of cores CR1 to CR4 may include first to fourth sub-feature extractors 301 to 304, respectively. Additionally, the core unit CR may include the detector 510. The first to fourth sub-feature extractors 301 to 304 may be included in the feature extractor 300 described above with reference to FIGS. 4 to 6. For example, each of the plurality of cores CR1 to CR4 may be included in a computational processing unit such as a CPU or an NPU. The core unit CR may be a unit group including a plurality of cores. For example, each of the plurality of cores CR1 to CR4 may perform an arithmetic operation using an artificial neural network. Additionally, each of the first to fourth sub-feature extractors 301 to 304 and the detector 510 may be an algorithm executed by the core unit CR.

The first to fourth sub-feature extractors 301 to 304 may output feature data FD of a plurality of masked images IMK, respectively. For example, the first sub-feature extractor 301 may generate and output first feature data FD1 based on the first masked image IMK1. Additionally, the second sub-feature extractor 302 may generate and output second feature data FD2 based on the second masked image IMK2. The third and fourth sub-feature extractors 303 and 304 may also generate and output third feature data FD3 and fourth feature data FD4, respectively, in a similar manner to that of the first sub-feature extractor 301.

The first and second masked images IMK1 and IMK2 may be based on partial regions of the input image IM. For example, the first masked image IMK1 may be an image obtained by masking, by the first mask data MK1, a region remaining by excluding the first region C1 from the first pyramid image PIM1. The first pyramid image PIM1 may be obtained by down-sampling the input image IM. Additionally, the second masked image IMK2 may be an image obtained by masking region remaining by excluding the second region C2 from the second pyramid image PIM2. Masking may be performed by the second mask data MK2. The second pyramid image PIM2 may be obtained by down-sampling the first pyramid image PIM1 or the input image IM. Therefore, the first feature data FD1 may include feature values of the first region C1 and the second feature data FD2 may include feature values of the second region C2.

As described above, the first sub-feature extractor 301 may output the first feature data FD1 including the feature values of the first region C1 to the detector 510. The second sub-feature extractor 302 may output the second feature data FD2 including the feature values of the second region C2 to the detector 510. The first region C1 and the second region C2 may include feature values of an image captured with different contexts, respectively. The first and second cores CR1 and CR2 may process the feature values of the different contexts, respectively, in a distribution manner.

Referring to FIG. 11B, the first core CR1 may not receive the first masked image IMK1. For example, as described above with reference to FIG. 8, the mask generator 230 may not generate the first mask data MK1. As a result, the masking unit 240 may not output the first masked image IMK1, wherein the first masked image IMK1 is an image including an image region farther than a certain distance. For example, the image region farther than the certain distance may be the first region C1. For example, the first region C1 may include a vanishing point. As another example, the first region C1 may include the farthest object includes in a front view ahead.

Additionally, the first and second cores CR1 and CR2 may share the second sub-feature extractor 302. The second sub-feature extractor 302 may output the second feature data FD2 to the detector 510 driven by the first core CR1. As a result, the first core CR1 may detect an object included in the second masked image IMK2 based on the second feature data FD2, wherein the second feature data is feature data about the second masked image IMK2.

Figure 12:
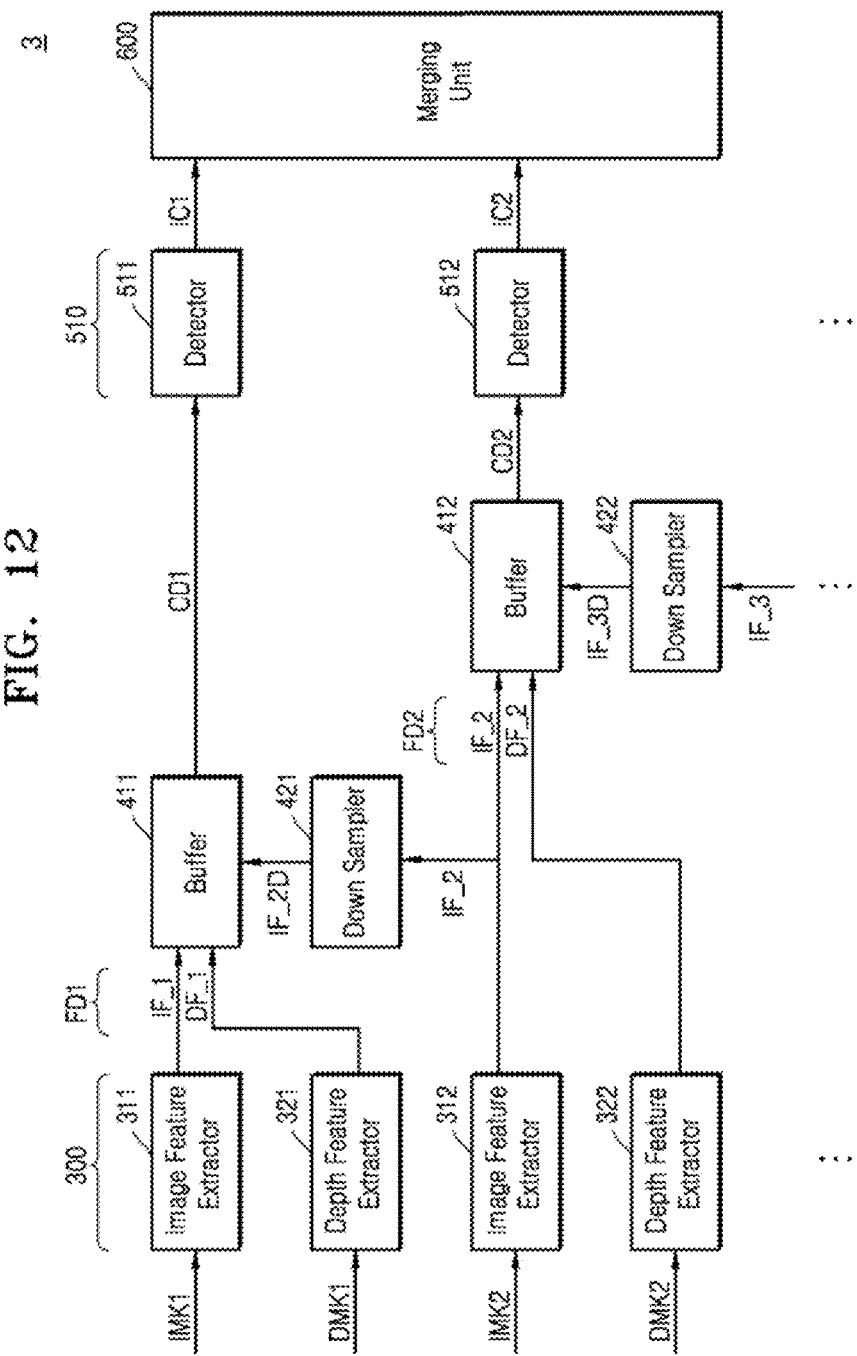
FIG. 12 is a block diagram of an electronic device according to an example embodiment of the inventive concept.

FIG. 12 is a block diagram of the electronic device 3 according to an example embodiment of the inventive concept. Hereinafter, a description refers to the reference signs of FIGS. 4 to 6.

Referring to FIG. 12, the electronic device 3 may include the feature extractor 300, a plurality of buffers, a plurality of down-samplers, the detector 510, and a merging unit 600. An example of a plurality of buffers may be first and second buffers 411 and 412. Additionally, an example of a plurality of down-samplers may be first and second down-samplers 421 and 422. The feature extractor 300 may further include a plurality of image extractors and a plurality of depth feature extractors. An example of a plurality of image extractors may be first and second image feature extractors 311 and 312. Additionally, an example of a plurality of depth feature extractors may be first and second depth feature extractors 321 and 322. The detector 510 may further include a plurality of sub-detectors, such as first and second sub-detectors 511 and 512. First feature data FD1 may include first image feature data IF_1 and first depth feature data DF_1. Second feature data FD2 may include second image feature data IF_2 and second depth feature data DF_2.

According to an example embodiment of the inventive concept, the first image feature extractor 311 may output the first image feature data IF_1 of the first masked image IMK1. The second image feature extractor 312 may output the second image feature data IF_2 of the second masked image IMK2.

The first down-sampler 421 may down-sample the second image feature data IF_2 according to a certain rate or a certain value. The first down-sampler 421 may then output first down-sampled feature data IF_2D. The first buffer 411 may output first concatenated data CD1 by concatenating the first feature data FD1 and the first down-sampled feature data IF_2D.

The first sub-detector 511 may receive the first concatenated data CD1 based on the first feature data FD1. The second sub-detector 512 may receive second concatenated data CD1 based on the second feature data FD2. The first sub-detector 511 and the second sub-detector 512 may output detection data IC1 and IC2 to the merging unit 600.

The merging unit 600 may identify information about an object based on the detection data IC1 and IC2. Because partial regions of a plurality of pieces of mask data MK overlap each other, an object included in the partial regions may be repetitively detected from a plurality of masked images IMK. The detection data IC1 and IC2 may include information a repetitively detected object. As a result, the merging unit 600 may remove a portion of data about the repetitively detected object and then merge the detection data IC1 and IC2. The merging unit 600 may identify information about an object by merging the detection data IC1 and IC2.

Figure 13:
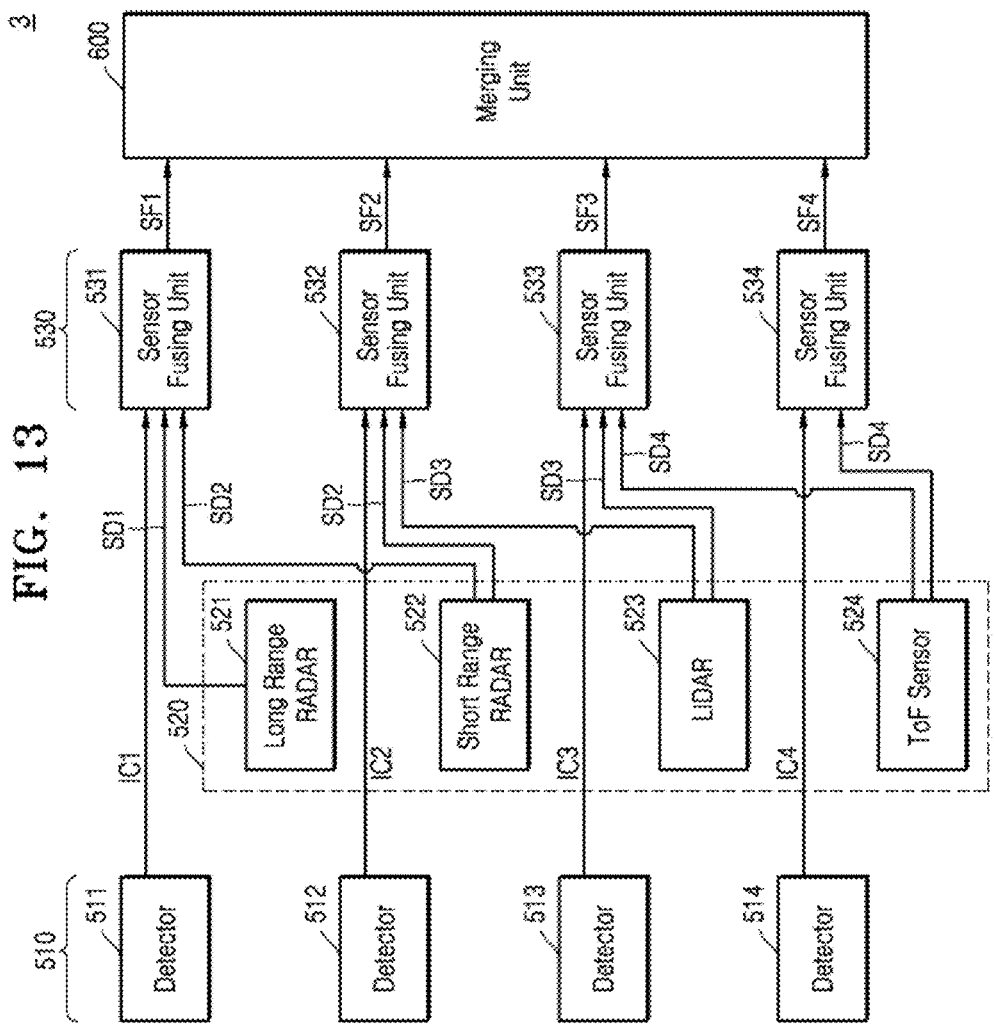
FIG. 13 is a block diagram of an electronic device for describing a sensor fusing operation, according to an example embodiment of the inventive concept.

FIG. 13 is a block diagram of the electronic device 3 for describing a sensor fusing operation, according to an example embodiment of the inventive concept.

Referring to FIG. 13, the electronic device 3 may include the detector 510, a second sensor unit 520, a sensor fusing unit 530, and the merging unit 600. The detector 510 may further include a plurality of sub-detectors, such as first to fourth sub-detectors 511 to 514. The second sensor unit 520 may further include a plurality of distance sensors, such as first to fourth distance sensors 521 to 524. The sensor fusing unit 530 may further include a plurality of sensor fusing units, such as first to fourth sensor fusing units 531 to 534.

According to an example embodiment of the inventive concept, the detector 510 may output a plurality of detection data, e.g., first to fourth detection data IC1 to IC4. The plurality of distance sensors 521 to 524 may output a plurality of pieces of sensing data, e.g., first to fourth sensing data SD1 to SD4, respectively. The first distance sensor 521 may have a longer effective sensing distance than the second distance sensor 522. For example, the first distance sensor 521 may be a long-range RADAR sensor, and the second distance sensor 522 may be a short-range RADAR sensor. The second distance sensor 522 may have a longer effective sensing distance than the third distance sensor 523. For example, the third distance sensor 523 may be a LIDAR sensor. The third distance sensor 523 may have a longer effective sensing distance than the fourth distance sensor 524. For example, the fourth distance sensor 524 may be a ToF sensor.

The first sensor fusing unit 531 may fuse the first detection data IC1, the first sensing data SD1, and the second sensing data SD2. The first detection data IC1 may be detected by the first sub-detector 511. The first sensing data SD1 may be output from the first distance sensor 521. The second sensing data SD2 may be output from the second distance sensor 522. For example, depth information insufficient in the first detection data IC1 may be complemented using the first sensing data SD1 and the second sensing data SD2. Therefore, the electronic device 3 may accurately identify an object. The sensor fusing unit 530 may output a plurality of pieces of fusing data SF1 to SF4 based on the fused data. The second sensor fusing unit 532 and the third sensor fusing unit 533 are similar to the description above. Therefore, a description thereof is omitted.

The fourth sensor fusing unit 534 may fuse the fourth detection data IC4 detected by the fourth sub-detector 514 and the fourth sensing data SD4 output from the fourth distance sensor 524. Unlike the first sensor fusing unit 531, the fourth sensor fusing unit 534 may use distance information output from one distance sensor (e.g., the fourth distance sensor 524). For example, the sensor fusing unit 530 may fuse sensing data output from at least one distance sensor and detection data.

The first detection data IC1 may be generated based on an image including an object of a farther distance than that of the second detection data IC2. For example, the first detection data IC1 may be based on feature values extracted from the first masked image IMK1. The second detection data IC2 may be based on feature values extracted from the second masked image IMK2. As described above, the first masked image IMK1 may include an object of a relatively farther distance than that of the second masked image IMK2.

The merging unit 600 may acquire various pieces of information about an object (e.g., another vehicle) included in the input image IM based on the plurality of pieces of fusing data SF1 to SF4. For example, the merging unit 600 may acquire information about 3D information of the object, a distance to the object, a speed, a type of the object, and the like. The merging unit 600 may provide the acquired information to the internal or external component of the electronic device 3.

The merging unit 600 may identify information about the object based on the plurality of pieces of fusing data SF1 to SF4. Because partial regions of a plurality of pieces of mask data MK overlap each other, an object included in the partial regions may be repetitively detected from a plurality of masked images IMK. The first to fourth detection data IC1 to IC4 may include information about the repetitively detected object. The plurality of pieces of fusing data SF1 to SF4 may be generated based on the first to fourth detection data IC1 to IC4. As a result, the merging unit 600 may remove a portion of data about the repetitively detected object and then merge the plurality of pieces of fusing data SF1 to SF4. The merging unit 600 may identify the information about the object by merging the plurality of pieces of fusing data SF1 to SF4.

Figure 14:
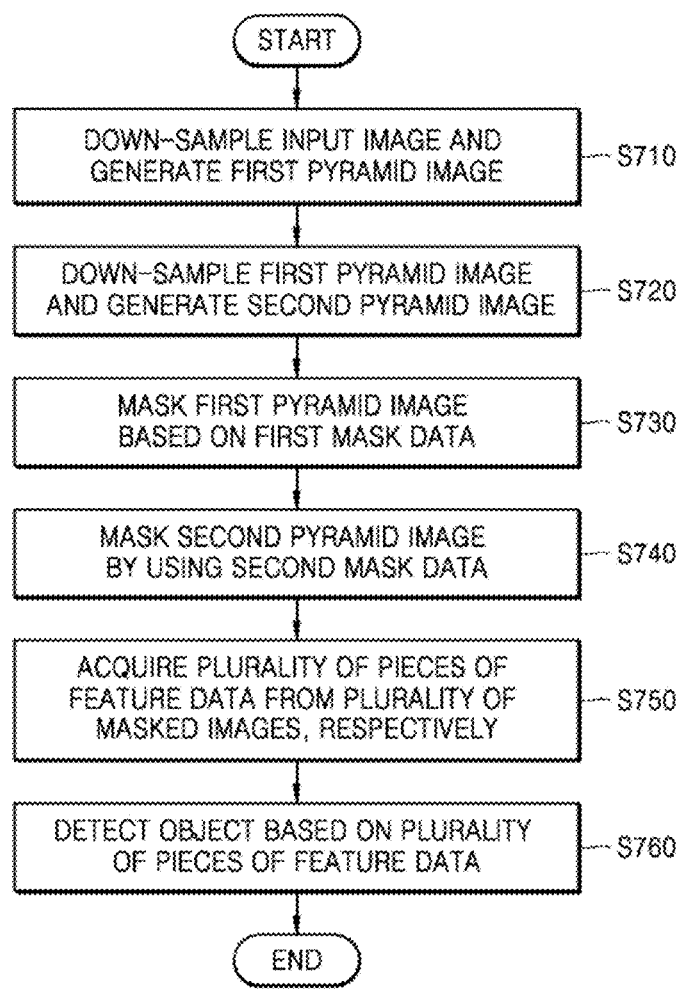
FIG. 14 is a flowchart of an operation method of an electronic device, according to an example embodiment of the inventive concept.

FIG. 14 is a flowchart of an operation method of an electronic device, according to an example embodiment of the inventive concept. Hereinafter, a description refers to the reference signs of FIGS. 4 to 6 and 11.

According to an example embodiment of the inventive concept, in operation S710, the electronic device 3 may down-sample the input image IM and generate the first pyramid image PIM1. In operation S720, the electronic device 3 may down-sample the first pyramid image PIM1 and generate the second pyramid image PIM2. The present embodiment is not limited thereto. The electronic device 3 may down-sample the input image IM and generate the second pyramid image PIM2.

In operation S730, the electronic device 3 may mask the first pyramid image PIM1 based on the first mask data MK1. For example, the electronic device 3 may mask a region remaining by excluding a partial region (first region) of which an average distance is a first value in the first pyramid image PIM1.

In operation S740, the electronic device 3 may mask the second pyramid image PIM2 based on the second mask data MK2. For example, the electronic device 3 may mask a region remaining by excluding a partial region (second region) of which an average distance is a second value less than the first value in the second pyramid image PIM2.

In operation S750, the electronic device 3 may acquire a plurality of pieces of feature data FD from a plurality of masked images IMK generated based on the masking operation (e.g., S730 and S740)

In operation S760, the electronic device 3 may detect an object outside the electronic device 3, based on the plurality of pieces of feature data FD For example, the electronic device 3 may detect an object in the first region based on the first feature data FD1 including feature values of the first region. Additionally, the electronic device 3 may detect an object in the second region based on the second feature data FD2 including feature values of the second region. For example, the electronic device 3 may identify an object of a relatively far distance based on the first feature data FD1 extracted from the first masked image IMK1. On the contrary, the electronic device 3 may identify an object of a relatively close distance based on the second feature data FD2 extracted from the second masked image IMK2.

Figure 15:
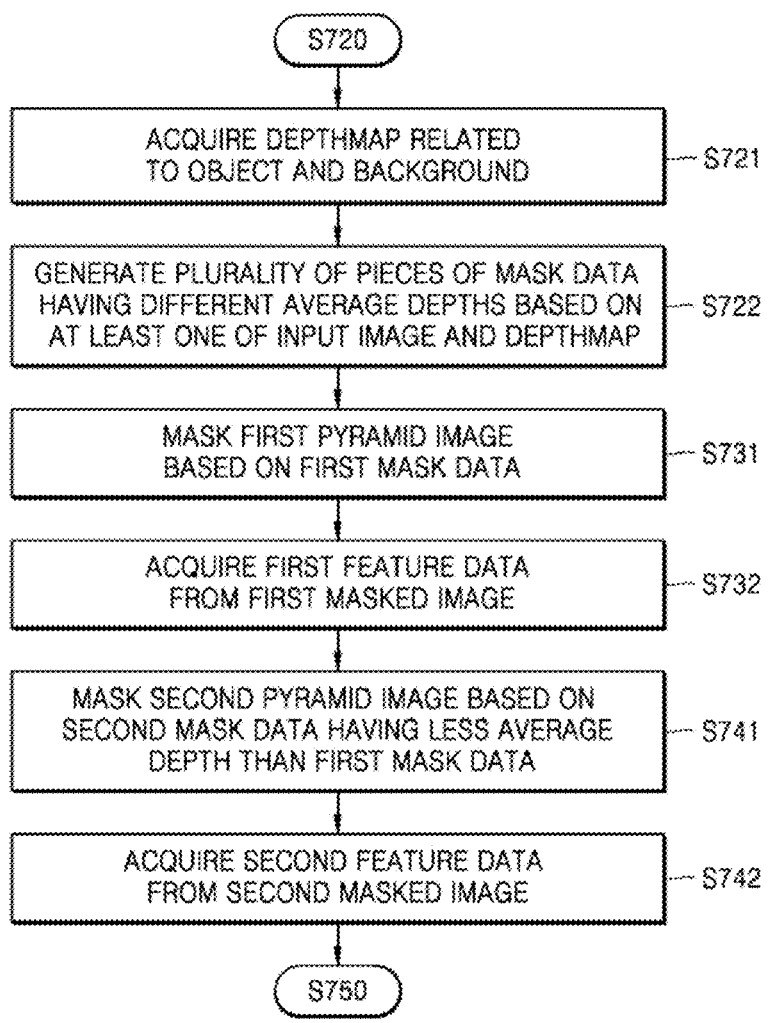
FIG. 15 is a flowchart of an operation method of an electronic device, according to an example embodiment of the inventive concept.

FIG. 15 is a flowchart of an operation method of an electronic device, according to an example embodiment of the inventive concept. Hereinafter, a description refers to the reference signs of FIGS. 4 to 6 and 9.

According to an example embodiment of the inventive concept, in operation S721, the sensor unit 100 may acquire a depthmap DP related to an object and a background of a front view ahead. For example, the sensor unit 100 may acquire a 2D image and acquire the depthmap DP based on the 2D image. As another example, the sensor unit 100 may acquire a 3D image and acquire the depthmap DP.

In operation S722, the electronic device 3 may generate a plurality of pieces of mask data MK with different average depths, based on at least one of the input image IM and the depthmap DP. For example, the plurality of pieces of mask data MK may include the first mask data MK1 and the second mask data MK2 with an average depth less than that of the first mask data MK1. For example, the depthmap DP may be acquired by using at least one of a stereo camera, a single camera, and a distance sensor. As a result, a plurality of pieces of mask data with different average depths may be generated.

In operation S731, the electronic device 3 may mask the first pyramid image PIM1 based on the first mask data MK1. The electronic device 3 may generate the first masked image IMK1 by masking the first pyramid image PIM1. In operation S732, the electronic device 3 may acquire the first feature data FD1 from the first masked image IMK1. In operation S741, the electronic device 3 may mask the second pyramid image PIM2 based on the second mask data MK2 with an average depth less than that of the first mask data MK1. The electronic device 3 may generate the second masked image IMK2 by masking the second pyramid image PIM2. In operation S742, the electronic device 3 may acquire the second feature data FD2 from the second masked image IMK2. For example, the first mask data MK1 and the second mask data MK2 may be resized to correspond to the first pyramid image PIM1 and the second pyramid image PIM2, respectively.

Figure 16:
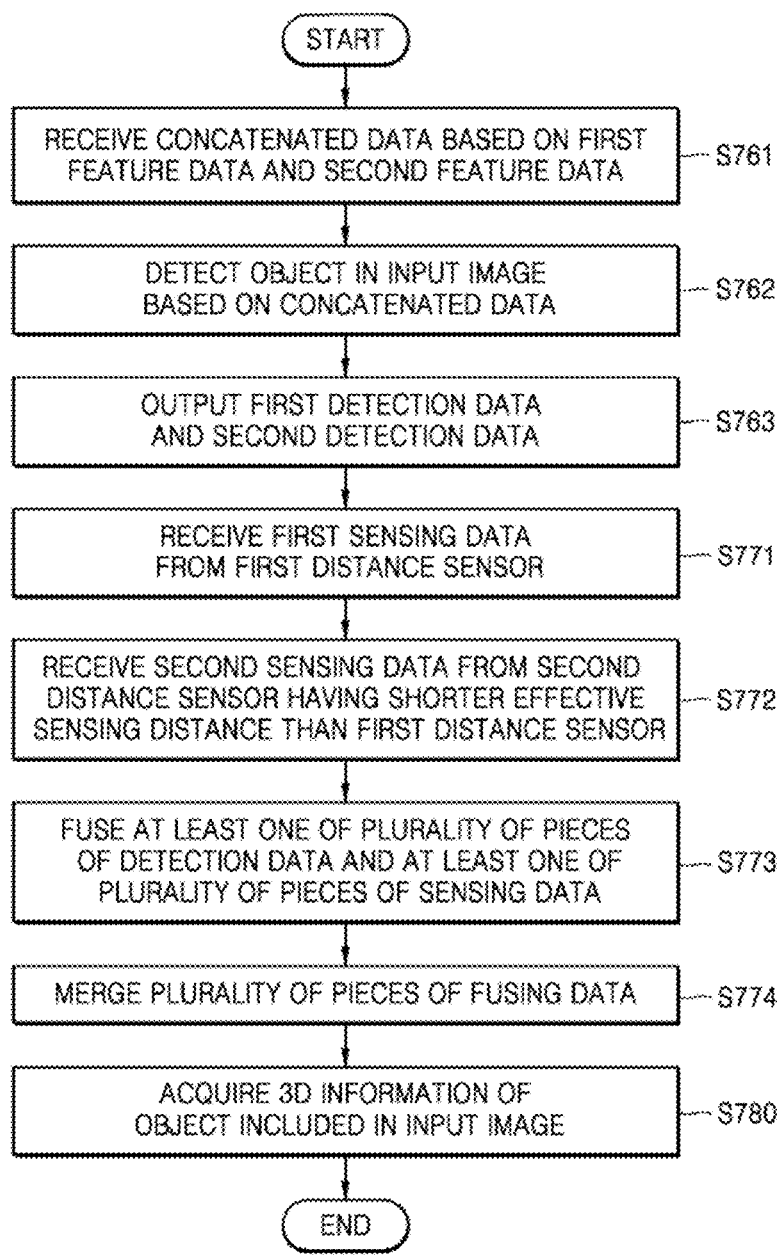
FIG. 16 is a flowchart of an operation method of an electronic device, according to an example embodiment of the inventive concept.

FIG. 16 is a flowchart of an operation method of an electronic device, according to an example embodiment of the inventive concept. Hereinafter, a description refers to the reference signs of FIGS. 4 to 6, 11A, 12, and 13.

According to an example embodiment of the inventive concept, in operation S761, the electronic device 3 may receive the concatenated data CD based on the first feature data FD1 and the second feature data FD2. The first feature data FD1 may include the feature values of the first masked image IMK1. The second feature data FD2 may include the feature values of the second masked image IMK2.

The electronic device 3 may detect an object in the input image IM based on the concatenated data CD in operation S762 and output detection data in operation S763. The detection data may include the first detection data IC1 and the second detection data IC2 described above with reference to FIG. 12.

The electronic device 3 may receive the first sensing data SD1 from the first distance sensor 521 in operation S771 and receive the second sensing data SD2 from the second distance sensor 522 with a shorter effective sensing distance than the first distance sensor 521 in operation S772. Thereafter, in operation S773, the electronic device 3 may fuse at least one of the plurality of pieces of detection data IC1 to IC4 and at least one of the plurality of pieces of sensing data SD1 to SD4. For example, the electronic device 3 may fuse the first detection data IC1 and the first sensing data SD1 and fuse the second detection data IC2 and the second sensing data SD2. The electronic device 3 may merge the plurality of pieces of fusing data SF1 to SF4 in operation S774 and acquire 3D information of the object included in the input image IM based on the merged data in operation S780.

Figure 17:
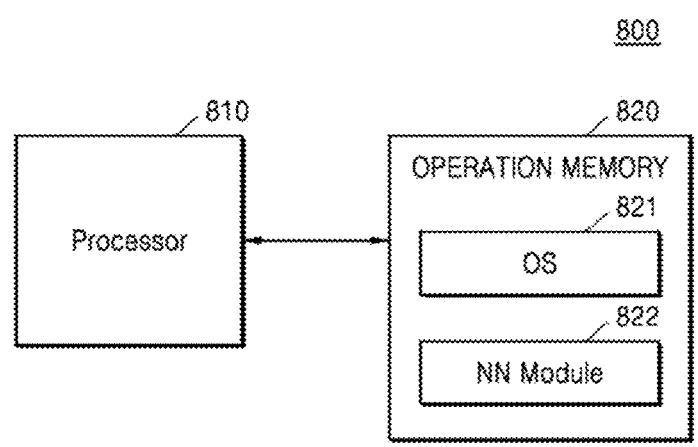
FIG. 17 is a block diagram of an electronic system according to an example embodiment of the inventive concept.

FIG. 17 is a block diagram of an electronic system according to an example embodiment of the inventive concept.

The electronic system shown in FIG. 17 may be an application processor 800. The application processor 800 may be implemented by a system on chip (SoC) as a semiconductor chip.

The application processor 800 may include a processor 810 and an operation memory 820. Additionally, although not shown in FIG. 17, the application processor 800 may further include one or more intellectual property (IP) modules connected to a system bus. The operation memory 820 may store software such as various kinds of programs and instructions associated with an operation of a system employing the application processor 800. Additionally, the operation memory 820 may include, for example, an OS 821 and an artificial neural network module 822. The processor 810 may generally control the operation memory 820. The artificial neural network module 822 may perform the image processing operation and the object recognition operation described above with reference to FIGS. 1 to 16.

While the inventive concept has been particularly shown and described with reference to embodiments thereof, it will be understood that various changes in form and details may be made therein without departing from the spirit and scope of the following claims.

What is claimed is:

1. A driving assistant system comprising:
   a first sensor unit configured to provide an input image including another vehicle and a background;
   an image processor configured to generate a plurality of pyramid images by down-sampling the input image, identify a depthmap including depth values to the other vehicle and the background, generate a plurality of pieces of mask data having different average depths of the depth values based on the depthmap, and output a plurality of masked images representing different average distances based on the plurality of pieces of mask data and the plurality of pyramid images;

a feature extractor configured to output feature data of each of the plurality of masked images; and a detector configured to detect the other vehicle included in the input image based on the feature data.

2. The driving assistant system of claim 1, wherein
the first sensor unit comprises a stereo camera,
the input image comprises a left-eye image and a right-eye image, and
the image processor is further configured to acquire the depthmap based on a comparison of the left-eye image and the right-eye image.

3. The driving assistant system of claim 2, wherein
the image processor is further configured to generate a region of interest (RoI) based on the input image and mask a region remaining by excluding the Ro from the plurality of pyramid images.

4. The driving assistant system of claim 1, wherein
the plurality of pyramid images comprises a first pyramid image and a second pyramid image, and
the image processor is further configured to generate the first pyramid image by down-sampling the input image and to generate the second pyramid image by down-sampling the first pyramid image.

5. The driving assistant system of claim 4, wherein
the plurality of pieces of mask data comprises first mask data and second mask data having a smaller average depth than the first mask data,
the plurality of masked images comprises a first masked image and a second masked image, and
the image processor is further configured to resize the first mask data and the second mask data so as to correspond to the first pyramid image and the second pyramid image, output the first masked image in which the first mask data is applied to the first pyramid image, and output the second masked image in which the second mask data is applied to the second pyramid image.

6. The driving assistant system of claim 1, wherein
the image processor is further configured to mask a region remaining by excluding at least one of the other vehicle, a road and a pedestrian from the input image and generate the plurality of pyramid images based on a masked image.

7. The driving assistant system of claim 1, wherein
the plurality of masked images comprises a first masked image and a second masked image,
the feature extractor is further configured to output first feature data generated based on the first masked image and second feature data generated based on the second masked image, and
the detector is further configured to receive concatenated data generated by concatenating the first feature data and the second feature data.

8. The driving assistant system of claim 7, further comprising:
a down-sampler configured to down-sample the second feature data and output down-sampled feature data; and
a buffer configured to output the concatenated data by concatenating the first feature data and the down-sampled feature data.

9. The driving assistant system of claim 1, further comprising:
a second sensor unit comprising a first distance sensor and a second distance sensor having a shorter sensing distance than the first distance sensor,
the detector further comprising a first sub-detector and a second sub-detector;
a first sensor fusing unit configured to fuse first detection data output from the first sub-detector and first sensing data output from the first distance sensor and output first fusing data; and
a second sensor fusing unit configured to fuse second detection data output from the second sub-detector and second sensing data output from the second distance sensor and output second fusing data,
wherein the first detection data is generated based on an image including an object of a farther distance than that of the second detection data.

10. The driving assistant system of claim 9, further comprising
a third distance sensor having a shorter sensing distance than the second distance sensor,
wherein the third distance sensor outputs third sensing data, and
the second sensor fusing unit is further configured to fuse the second detection data, the second sensing data, and the third sensing data.

11. The driving assistant system of claim 9, further comprising a merging unit configured to acquire three-dimensional information of the other vehicle based on the first fusing data and the second fusing data.

* * * * *